(12) United States Patent
Rose et al.

(10) Patent No.: US 6,602,534 B1
(45) Date of Patent: Aug. 5, 2003

(54) PROCESS FOR ENHANCING THE STARCH GELATION IN LEGUMES

(75) Inventors: Sara Rose, Knoxville, TN (US); Condon S. Bush, Knoxville, TN (US); Griscom Bettle, III, Sarasota, FL (US); Joseph L. Rutzinski, Morristown, TN (US); Larry Malnati, Dandridge, TN (US)

(73) Assignee: Bush Brothers & Company, Knoxville, TN (US)

( * ) Notice: Subject to any disclaimer, the term of this patent is extended or adjusted under 35 U.S.C. 154(b) by 0 days.

(21) Appl. No.: 09/489,746

(22) Filed: Jan. 21, 2000

Related U.S. Application Data
(60) Provisional application No. 60/116,892, filed on Jan. 22, 1999.

(51) Int. Cl.$^7$ ................................................. A23L 1/00
(52) U.S. Cl. ........................ 426/507; 426/508; 426/634
(58) Field of Search ............................... 426/507, 508, 426/509, 629, 634, 460

(56) References Cited

U.S. PATENT DOCUMENTS

| | | | |
|---|---|---|---|
| 202,975 | A | 4/1878 | Andres |
| 1,495,736 | A | 5/1924 | Hadley |
| 1,548,796 | A | 8/1925 | Libby |
| 1,718,187 | A | 6/1929 | Bartlett |
| 1,813,268 | A | 7/1931 | Bachler |
| 2,232,282 | A | 2/1941 | Struble |
| 2,278,475 | A | 4/1942 | Musher |
| 2,360,062 | A | 10/1944 | Lannen |
| 2,952,543 | A | 9/1960 | Szczesniak et al. |
| 3,126,285 | A | 3/1964 | Lippold |
| 3,220,451 | A | 11/1965 | Bollens et al. |
| 3,253,930 | A | 5/1966 | Gould et al. |
| 3,290,159 | A | 12/1966 | Dorsey et al. |
| 3,364,034 | A | 1/1968 | Hoersch et al. |
| 3,594,184 | A | 7/1971 | Hawley et al. |
| 3,594,185 | A | 7/1971 | Hawley et al. |
| 3,594,186 | A | 7/1971 | Hawley et al. |
| 3,598,610 | A | 8/1971 | Hawley et al. |
| 3,632,346 | A | 1/1972 | Sherba |
| 3,869,556 | A | 3/1975 | Rockland et al. |
| 3,876,807 | A | 4/1975 | Wagner et al. |
| 3,971,856 | A | 7/1976 | Daftary |
| 3,973,047 | A | 8/1976 | Linaberry et al. |
| 4,064,277 | A | 12/1977 | Yokotsuka et al. |
| 4,194,016 | A | 3/1980 | Weaver et al. |
| 4,216,235 | A | 8/1980 | Dasek et al. |
| 4,333,955 | A | 6/1982 | Murata et al. |
| 4,376,127 | A | 3/1983 | Lunde |
| 4,376,128 | A | 3/1983 | Lunde |
| 4,407,840 | A | 10/1983 | Lathrop et al. |
| 4,483,874 | A | 11/1984 | Olsen |
| 4,645,677 | A | 2/1987 | Lawhon et al. |
| 4,729,901 | A | 3/1988 | Rockland et al. |
| 4,871,567 | A | 10/1989 | Sterner et al. |
| 4,908,224 | A | 3/1990 | Yoder |
| 4,940,598 | A | * 7/1990 | Zanichelli .................. 426/507 |
| 5,100,679 | A | 3/1992 | Delrue |
| 5,436,003 | A | 7/1995 | Rohde, Jr. et al. |
| 5,445,957 | A | 8/1995 | Rohde, Jr. et al. |
| 5,545,425 | A | 8/1996 | Wu |
| 5,599,572 | A | 2/1997 | Bourne |
| 5,607,712 | A | 3/1997 | Bourne |
| 5,645,879 | A | 7/1997 | Bourne |
| 5,648,210 | A | 7/1997 | Kerr et al. |
| 5,651,967 | A | 7/1997 | Rohde, Jr. et al. |
| 5,710,365 | A | 1/1998 | Kerr et al. |
| 5,773,699 | A | 6/1998 | Kerr et al. |
| 5,871,801 | A | 2/1999 | Kazemzadeh |
| 6,238,725 | B1 | 5/2001 | Bush et al. |

OTHER PUBLICATIONS

Abdel–Gawad, A.S., "Effect of domestic processing on oligosaccharide content of some dry legume seeds," *Food Chemistry,* vol. 46, (1993), pp. 25–31.

"The International Dry Bean Symposium," Michigan State University, Michigan Bean Commission, Michigan Bean Shippers Association, Aug. 22–24, 1972.

Borejszo, Z., et al., "Reduction of Flatulence–Causing Sugars by High Temperature Extrusion of Pinto Bean High Starch Fractions," *Journal of Food Science,* vol. 57(3), (1992), pp. 771–772.

Calloway, D.H., et al., "Reduction of Intestinal Gas–Forming Properties of Legumes by Traditional and Experimental Food Processing Methods," *Journal of Food Science,* vol. 36, (1971), pp. 251–255.

Fleming, S.E., "Flatulence Activity of the Smooth–Seeded Field Pea as Indicated by Hydrogen Production in the Rat," *Journal of Food Science,* vol. 47, (1981), pp. 12–15.

Fleming, S.E., "A Study of Relationships Between Flatus Potential and Carbohydrate Distribution in Legume Seeds," *Journal of Food Science,* vol. 46, (1981), pp. 794–803.

Fyfield, T.P., et al., "Effects of Temperature and Water Potential on Germination, Radicle Elongation and Emergence of Mungbean," *Journal of Experimental Botany,* vol. 40(215), Jun. 1989, pp. 667–674.

Ganiats, T.G., et al., "Does Beano Prevent Gas? A Double–blind Crossover Study of Oral α–Galactosidase to Treat Dietary Oligosaccharide Intolerance," *The Journal of Family Practice,* vol. 39(5), Nov. 1994, pp. 441–445.

Goel, R., et al., "Removal of Flatulence Factor of Some Pulses by Microbial Fermentation," *The Ind. J. Nutr. Dietet.,* vol. 18, (1980), pp. 215–217.

Hsu, D., et al., "Effect of Germination on Nutritive Value and Baking Properties of Dry Peas, Lentils, and Faba Beans," *Journal of Food Science,* vol. 45, (1980), pp. 87–92.

(List continued on next page.)

*Primary Examiner*—George C. Yeung
(74) *Attorney, Agent, or Firm*—Scully, Scott Murphy & Presser

(57) ABSTRACT

The present invention is directed to a method of preparing a legume resulting in reduced flatulence when ingested and the product thus prepared. It is also directed to a process for reducing the flatulence of a flatulence-causing legume. It is also directed to a product produced therefrom.

36 Claims, 5 Drawing Sheets

OTHER PUBLICATIONS

Iyer, V., et al., "Quick–cooking beans (*Phaseolus vulgaris L.*): I. Investigations on quality," *Qual. Plant Plant Foods Hum. Nutr.*, vol. 30, (1980), pp. 27–43.

Kinsella, J.E., "Functional Properties of Proteins in Foods: A Survey," *Critical Reviews in Food Science and Nutrition*, Apr. 1976, pp. 219–280.

Obendorf, R., "Oligosaccharides and galactosyl cyclitols in seed desiccation tolerance," *Seed Science Research*, vol. 7, (1997), pp. 63–74.

Olson, A.C., et al., "Flatus Causing Factors in Legumes," *Antinutrients and Natural Toxicants in Foods*, Food & Nutrition Press, Inc., (1981), pp. 275–294.

Abstract of Papers, Olson, A.C., "Flatus Causing Factors in Legumes," *American Chemical Society*, vol. 177 (1), p. 37.

Powers, J.J., et al., "Gelation of Canned Peas and Pinto Beans as Influenced by Processing Conditions, Starch and Pectic Content," *Food Technology*, Feb. 1961, pp. 41–47.

Price, K.R., et al., "Flatulence—Causes, relation to diet and remedies," *Die Nahrung*, vol. 32(6), (1988), pp. 609–626.

Rao, V.S., et al., "Effects of Gamma–Irradiation on Flatulence–Causing Oligosaccharides in Green Gram (*Phaseolus Areus*)," *Journal of Food Science*, vol. 48, (1983), pp. 1791–1795.

Schoch, T.J., et al., "Preparation and Properties of Various Legume Starches," Nov. 1968, pp. 565–573.

Naczk, M., et al., "α–Galactosides of Sucrose in Foods: Composition, Flatulence–Causing Effects, and Removal," *American Chemical Society*, ACS Symposium Series 662, pp. 127–151.

Sathe, S.K., et al., "Dry Beans of Phaseolus. A review. Part 2. Chemical Composition: Carbohydrates, Fiber, Minerals, Vitamins and Lipids," *CRC Critical Reviews in Food Science and Nutrition*, vol. 21(1), pp. 41–93.

Sathe, S.K., et al., "Technology of Removal of Unwanted Components of Dry Beans," *CRC Critical Reviews in Food Science and Nutrition*, vol. 21 (3), pp. 263–287.

Ku, S., et al., "Extraction of Oligosaccharides During Cooking of Whole Soybeans," *Journal of Food Science*, vol. 41, (1976), pp. 361–364.

Uebersax, M.A., et al., "Strategies and Procedures for Processing Dry Beans," *Food Technology*, Sep. 1991, pp. 104–110.

Kon, S., "Pectic Substances of Dry Beans and Their Possible Correlation with Cooking Time," *Journal of Food Science*, vol. 33, (1968), pp. 437–438.

Vidal–Valverde, C., et al., "Changes in the carbohydrate composition of legumes after soaking and cooking," *Journal of the American Dietetic Association*, vol. 93(5), May 1993, pp. 547–550.

"Flatulence Problem," *CRC Handbook of World Food Legumes*, vol. 1, pp. 64–74.

Chung, Y., Dissertion: "Changes in Cell Wall Structure and Starch Digestibility During Cooking of Dry Bean (Phaseolus Vulgaris L.)," Michigan State University, 1996.

King, M.M., Dissertion: "Alpha–Galactosidase Activity and Oligosaccharide Hydrolysis in cowpea (Vigna Unguiculata L. Walp) Seeds and Flour)," University of Arkansas, May 1987.

The Brilliant Bean, Bantam Book, Feb. 1988, by Sally & Martin Stone.

* cited by examiner

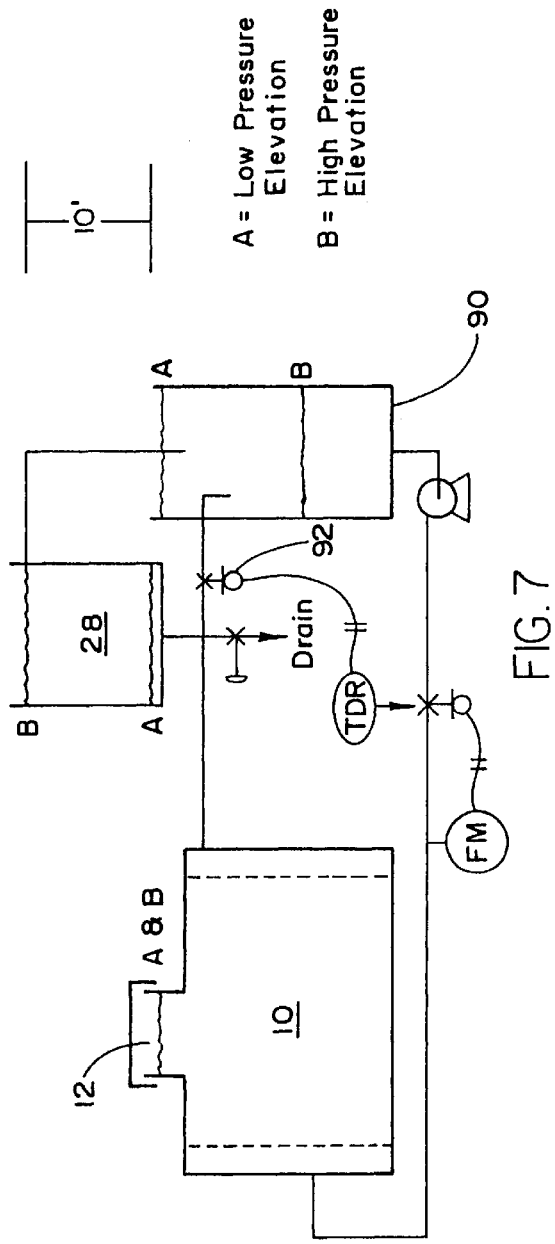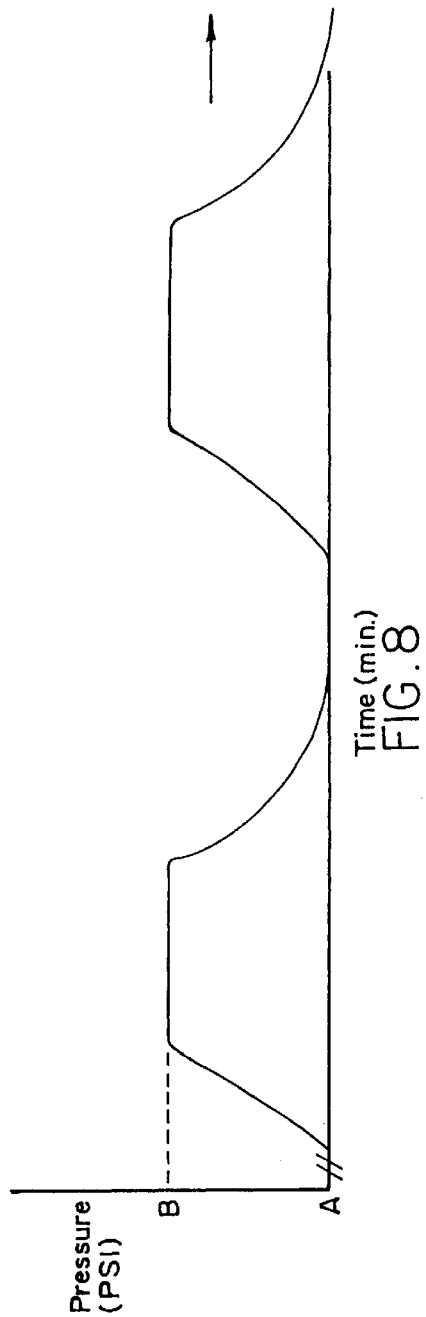

PROCESS FOR ENHANCING THE STARCH GELATION IN LEGUMES

RELATED APPLICATION

The present application is claiming priority of copending provisional application U.S. Ser. No. 60/116,892 filed on Jan. 22, 1999.

FIELD OF THE INVENTION

The present invention relates to a process for preparing legumes exhibiting reduced flatulence when digested by mammals and a process for reducing flatulence in legumes when digested by mammals and the products thus prepared.

BACKGROUND OF THE INVENTION

Legumes are important foodstuffs and are likely to become more so in the future. For example, many legumes, especially those in some of the legume genuses, such as Phaseolus, Soja and Lens, are high in protein and provide an inexpensive alternative to animal protein.

Unfortunately, ingestion of some of the most nutritious and abundant legumes can be accompanied by severe flatulence as well as abdominal distress and poor digestibility. More specifically, the flatulence results in discomfort, diarrhea, loss of appetite, and poor growth, all of which have prevented the wide-scale use of these vegetable nutrients.

It is believed that the flatulence is due to various factors. For example, it has been postulated that the flatulence is attributable to the indigestibility by mammalian digestive enzymes of the flatulence-causing alpha oligosaccharides, such as raffinose, stachyose, and verbascose, and the like, present in legume products. The generally accepted explanation of the action of the alpha oligosaccharides in producing flatulence is that the enzyme alpha galactosidase, which hydrolyzes the α-oligosaccharides, is not present in the intestinal tract of mammals. Thus, these compounds are not hydrolyzed and dissolved in the digestive tract so that they can be absorbed. Instead, they reach the lower intestine essentially intact. Here, anaerobic bacteria ferment these sugars with the resultant production of carbon dioxide, hydrogen, and methane gases, thereby producing flatus.

However, these α-oligosaccharides are believed not to be the only source present in the legume that causes flatulence. It has been reported that flatulence is also due to components present in the cell wall fiber constituents. Other have conjectured that, besides the galactose-containing oligosaccharides, undigested starch and protein in the legumes are contributing factors to flatus production.

Various solutions have been proposed to reduce flatulence in legumes, but many of these focus on just one of the factors described hereinabove, viz., the flatulence-causing oligosaccharides and not on enhancing the digestion of the starch in the legume. It has been suggested by researchers, however, that, at least with beans, oligosaccharides account for only about ⅓ of the cause of flatulence, and that ⅔ is caused by other components such as, e.g., undigested starch in the bean. Other research indirectly suggests that the sugars are responsible for the violent "episodes" that occur approximately within five hours after ingestion of the legume, while "background flatulence", which occurs regularly over a six to eight hour period after eating, is caused by the non-digested starch. Unfortunately, very little research, in comparison, has been directed to reducing the flatulence caused by these other components.

Recently, Yansoo Chung, in his Ph.D. thesis from Michigan State University (1996), reported that cooking whole navy beans for 10 minutes caused starch crystallization within the cell wall of the navy beans, thus impeding and preventing the digestive enzymes in the stomach from digesting (hydrolyzing) the starch.

Therefore, based upon these findings additional investigations are required to find the appropriate conditions to prevent such crystallization from occurring and thereby enhance the digestibility of these starches in the bean.

However, the present inventors have found a means to effectively reduce the flatulence caused from the undigestible starch in the legume.

SUMMARY OF THE INVENTION

The present invention is directed to a process for maximizing starch gelation in a legume when digested by mammals, which process comprises:

(1) soaking a legume in a water bath in stagnant, sprayed or flowing water at a first temperature which is at or above ambient temperature but less than the first critical rehydration temperature, under conditions effective and for a period of time sufficient to produce a rehydrated legume having a moisture content which is at least 50% of that of a fully hydrated legume but less than a fully hydrated legume;

(2) heating the product of step (1) in a water bath to a second temperature under conditions effective to increase the moisture content to an amount which is greater than that of full hydration; said second temperature being greater than the first critical rehydration temperature and at about or greater than the endogenous oligosaccharide-reducing enzyme inactivation temperature and less than the maximum temperature of starch gelation; and (3) optionally blanching the product of step (2) at blanching effective temperatures, said blanching temperature being greater than the first and second temperatures.

The present invention is also directed to the preparation of a legume exhibiting reduced flatulence when digested by a mammal, which comprises repeating steps (1)–(3) hereinabove, and then (4) mixing the legume thus treated with a food acceptable vehicle to form a legume-based mixture; and (5) treating the product of step (5) under the desired preservation methods.

The present invention is also directed to the product thus formed by the processes described hereinabove.

In another embodiment of the present invention, the legumes are prepared by the above process with an additional step between steps 1 and 2. More specifically, the product of step (1) is first heated in a soak water bath at a transition temperature which is greater than the first temperature but less than the second temperature.

In still another embodiment of the present process, the soak water is fully or partially drained and replaced and fresh water is simultaneously added or bled in during the full or partial drain; this may occur after or even during any of the steps enumerated hereinabove at a rate sufficient to maintain a positive oligosaccharide driving force at a level that minimizes cracking for a time sufficient to reduce the brix of the soak water. This step can be repeated any number of times.

In another embodiment of the present invention, after the second step of the process but prior to blanching, the temperature of the soak water bath is optionally lowered to a third temperature until the oligosaccharide content of the legume is lowered to a desired level.

In another embodiment, an aqueous solution of a food grade calcium sequestering agent, such as a phosphate salt is added to the soak water at a concentration and for a time sufficient to soften the legumes as desired. The calcium sequestering agent can be added to the soak water at any step in the process.

BRIEF DESCRIPTION OF THE DRAWINGS

FIG. 7 illustrates a diagrammatic representation of a modified horizontal flow soak tank system; and FIG. 8 illustrates a graph of pressure over time profile for the modified system of FIG. 7.

DETAILED DESCRIPTION OF THE INVENTION

Figure 1:
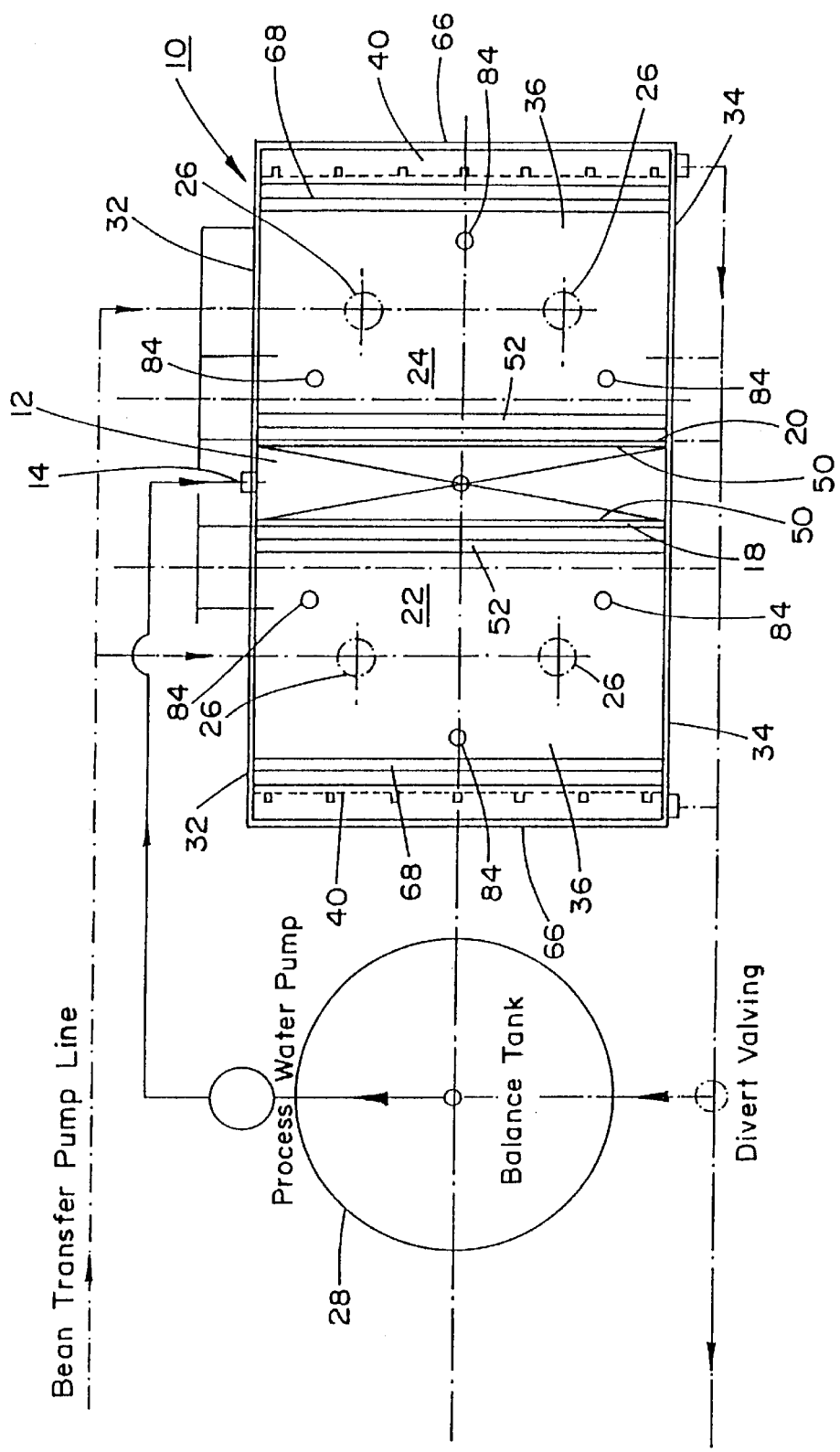
FIG. 1 illustrates, generally diagrammatically, a top plan view of a horizontal flow soak tank system.

As used herein, the term "legume" refers to a vegetable belonging to the family Leguminosae. It is characterized as having a dry, dehiscent fruit derived from a single, simple pistil. When mature, it splits along both dorsal and ventral sutures into two valves. The family Leguminosae characteristically contains a single row of seeds attached along the lower or ventral suture of the fruit. Ordinarily, the legume seeds used for the present invention are the usual dry seeds available in commerce. For example, in the case of beans, these products are referred to as dry beans because the product includes only the mature seeds, the pods having been removed. Examples of legume seeds useful in the present invention include seeds of the genus Phaseolus, including, without limitation, the common beans such as large white or Great Northern, small white, pinto, red kidney, black, calico, pink cranberry, red mexican, brown, bayo, lima, navy and the like; the genus Pisum, including, without limitation, smooth and wrinkled peas and yellow or green varieties and the like; the genus Vigna, including the black eye beans (or black eye peas as they are sometimes termed), cowpeas, purple hull peas, cream peas, crowder peas, field peas and the like; the genus Lens, including without limitation, lentils; the genus Cicer, including, without limitation, garbanzo beans and chick peas; the genus Soja, including, without limitation, soybeans; and the like. Other examples of legume seeds useful in the present invention include red beans, yellow-eye beans, azuki beans, mung beans, tepary beans, and fava beans and the like. The preferred legumes are those from the genus Phaseolus, Cicer, and Vigna. The more preferred legumes are navy beans, pinto beans, kidney beans, large white or Great Northern beans, small white beans, black beans, red beans, pink beans, lima beans, lentil, cow peas, soybean, black-eye peas, field peas, garbanzo beans and chick peas. The most preferred legumes are beans, especially navy beans, pinto beans, and kidney beans.

As defined herein, the term "naturally occurring oligosaccharide-reducing enzyme" is the enzyme naturally present in the legume which is capable of modifying the flatulence-causing oligosaccharides, as defined herein. Without wishing to be bound, it is believed that in beans, especially navy beans, this enzyme is α-galactosidase.

"Flatulence-causing oligosaccharides", as defined herein, are oligosaccharides that are not digestible by the mammal and cause flatulence as a result therefrom. They are not simple sugars, but include trisaccharides and higher saccharides. Examples include raffinose, stachyose, verbascose, and the like.

As described hereinabove, aspects of the present invention are directed to a process of reducing flatulence in mammals when digesting legumes and a process of preparing legumes exhibiting this reduced flatulence when digested by mammals. The term "mammals" includes any species of the class Mammalia of higher vertebrates which are characterized by, inter alia, being warm blooded, having mammary glands, and having a body covered by hair. Examples include man, dog, cat, horse, pig, cow and the like.

The present inventors realized that many factors contribute to the flatulence caused by legumes. Besides the flatulence-causing oligosaccharides, the present inventors realized that there are other components in addition thereto present in the legume which are responsible for producing flatulence when the legume is ingested by mammals, which other components the prior art has neglected to consider in attempts to reduce flatulence. One example of these other components includes undigestible or crystalline starch. The objective therefore was to maximize starch gelation to make the starch more digestible by the mammal, thereby decreasing the flatulence of the legume.

The present inventors have described additional processes for reducing flatulence in legumes in copending applications, entitled "A PROCESS FOR REDUCING FLATULENCE IN LEGUMES", having U.S. Ser. No. 09/236,314, now U.S. Pat. No. 6,465,031; "A PROCESS FOR REMOVING FLATULENCE-CAUSING OLIGOSACCHARIDES IN LEGUMES", having U.S. Ser. No. 09/236,313, now U.S. Pat. No. 6,238,725; and "AN IMPROVED PROCESS FOR REDUCING FLATULENCE IN LEGUMES", filed concomitantly herewith, the contents of all of these applications being incorporated herein by reference.

Utilizing the process described herein, the inventors have developed a means of producing legumes, including beans, that exhibit less flatulence when digested relative to the untreated legumes. Unlike products in the prior art, substantially all of the gelatinizable starch in the legumes produced by the present process is gelatinized, making the legume product more digestible and producing less frequent episodes of flatulence.

Legume starch is a restricted starch, meaning that not all of the starch is capable of becoming gelatinized. However, by subjecting the legume to the process described hereinbelow, substantially all of the starch that could be gelatinized, is gelatinized. Preferably, in the legume product produced by the present invention, more than about 84% of the total starch in the legume is gelatinized and more preferably more than about 87% of the total starch in the legume is gelatinized.

During the present process there is some oligosaccharide reduction in the legume produced in accordance with the present invention. In one embodiment of the present invention, the oligosaccharides present in the legume is reduced to a desired level.

The present process produces products resulting in less frequent episodes and less volume of flatulence as well as reduction in other symptoms of discomfort, such as bloating, abdominal pain, belching or "feeling of fullness" relative to products commercially made and in the prior art.

The moisture content of the legume produced by the present process, however, is in the range normally found in legumes that are sold commercially. For example, with respect to beans, it is preferred that the moisture content in the product of the present invention ranges from about 40% to about 70% by weight, more preferably from about 45% to about 65% by weight, and most preferably from about 57% to about 63% by weight.

Thus, the present inventors have developed a process for implementing the aforementioned strategy.

The process of the present invention promotes starch gelatinization in the legume when the legume is subjected to starch gelatinization conditions, thereby enhancing the digestibility of the legume. As the skilled artisan is well aware, crystalline starch in the cell of the legume is not readily digestible. Thus, the strategy developed by the present inventors is to subject the legumes to conditions effective to maximally gelatinize the starch, i.e., permit the crystals of starch to transition to an amorphous stage, while minimizing coagulation of the protein surrounding the starch granule. Without wishing to be bound, it is believed that if protein coagulation occurs too prematurely, it will prevent the starch from fully swelling and gelatinizing, thereby causing the starch to remain undigestible by mammals when ingested. On the other hand, by minimizing protein coagulation before starch gelation, flatulence is reduced since the swollen starch granules are digestible by the mammal when ingested.

Without wishing to be bound, it is believed that the presence of phytic acid in the legume promotes protein coagulation. The phytic acid is produced enzymatically with a phytic acid producing enzyme.

While not meaning to be bound, it is believed that the protein coagulation temperature is affected by pH. When the pH is lowered, protein coagulates at a lower temperature. It is well known that legumes contain myoinositol hexaphosphate and that said legumes also contain an enzyme, herein referred to as phytase, or phytic acid producing enzyme, that breaks down the hexaphosphate into, among other compounds, phytic acid and phosphate. It is also well known that the most active temperature for phytase is about 122° F. and that said phytase is largely inactivated at temperatures greater than 140° F.

At Step 1 soaking temperatures as defined herein, without wishing to be bound, it is believed that the phytase is activated and the soak water pH drops (as phytic acid is produced). The drop in pH is believed to lower the onset temperature of protein coagulation (premature protein coagulation). The present inventors have found that a too low pH reduced starch gelation, presumably by encouraging premature protein coagulation.

It is well known that another family of enzymes, pectin methyl esterase, herein referred to as pectase, stiffens cell walls when the enzymatically formed pectate reacts with free calcium to form calcium pectate. Without wishing to be bound, it is believed that the pectase reaction is first activated at the critical rehydration temperature, as defined herein. It is also well known that phosphate can sequester calcium.

Without wishing to be bound, the Step 1 soaking conditions then is a balance between not creating excess phytic acid to discourage unwanted premature protein coagulation (a form of cell wall strengthening) and simultaneously forming phosphate which ties up excess calcium, and thus is a form of cell wall weakening.

In the various process steps described hereinbelow, the legumes are placed in water and are soaked therein. Water sources known to the skilled artisan may be utilized in the present invention. By "water source", it is meant the water used to initially soak the legumes or any water subsequently added to the soak water. The term "water source" refers to any source of water or moisture, including steam. Preferably, the water source is tap water, deionized water, distilled water or combinations thereof. Although the water may contain mineral salts, it is more preferable that the water not contain too large a mineral content. Thus, the water source also includes soft water.

The water used in the preconditioning step may be soft water or hard water, although the latter is preferred.

The inventors have found that the amount of calcium in the soak water in the first step has an ultimate effect on the frequency of flatus events after ingestion by the mammal as well as the texture of the product so prepared. It is preferred therefore, that the soak water used in the first step contains some calcium. Although the amount of calcium in the soak water in the first step may range from 0 ppm to about 120 ppm, it is preferred that the concentration of calcium in the initial soak water in the first step ranges from about 30 ppm to about 100 ppm and most preferably about 50 ppm to about 75 ppm. However, after the first step, in step 2 of the present process, and in the transition step and in the optional step between step 2 and optional blanching, if additional water is added to the soak water or if the soak water is changed, unless indicated to the contrary hereinbelow, soft water (e.g., water containing less than 90 ppm calcium) is preferred over hard-water (e.g., water containing greater than 200 ppm calcium). It is more preferred that the calcium ion concentration in the water from the water source in step 2 or in the optional transition step or in the optional step subsequent to step 2 but before the optional blanching of the present process is less than about 70 ppm and more preferably less than about 50 ppm and most preferably having about 0 ppm calcium. If the water from the water source contains too high a level of calcium, the calcium, if desired, can be removed by utilizing ion exchange filtration or passing the water through an ion-exchange column, or treating the hard water with zeolite, utilizing techniques known ordinary to the skilled artisan.

The age of the legume utilized in the process described hereinbelow may vary, e.g., from as young as about 1 day or about 1 week after harvesting to as old as two or three years after harvesting. There are differences in behavior between the younger and older legumes. For example, the older legumes will generally take longer to rehydrate and to remove the flatulence-causing oligosaccharides therefrom, but they generally provide a better yield. In addition, the younger legumes exhibit better appearance due to the reduction of cracked and split legumes, e.g., beans, as well as a smoother, creamier texture after cooking. Although legumes of various ages may be used in the present process, it is preferred that the legumes utilized in the process described hereinbelow are less than about 13 months old, and more preferred that the legumes are less than about 6 months old and most preferred that the legumes are less than about 4 months old.

In addition, it is preferred that the legumes that are used are about the same temperature and are about 20–40° F.

below room temperature. This can be achieved by storing the legumes, prior to being subjected to the process steps described herein, at a temperature ranging from about 35° F. to about 60° F. and more preferably about 40° F. to about 50° F. with the most preferred temperature being about 40° F. for a time sufficient for the legumes to reach an equilibrium temperature (thermal equilibrium). The storage facility in which the legumes are placed are those commonly used in the art and include, without limitation, vessels, containers, bins, rooms, buildings or other areas or containers commonly used to for purposes of storage and for equilibration of the temperature of food products. The amount of time required to achieve an equilibrium temperature within the ranges indicated hereinabove, may vary, depending on the amount of legumes to be stored, the size of the legumes, the size of the storage facility in which the legumes are placed for storage, and the like. However, one of ordinary skill in the art can determine the appropriate conditions, without an undue amount of experimentation, to effect the legumes attaining the desired initial temperature. The inventors have found that the texture of the legume produced when stored and equilibrated to one temperature produces a legume having creamier texture relevant to a legume not so treated.

In addition, the moisture content of legumes utilized may vary. In particular, moisture content is dependent upon several factors, such as the type of legume, the variety within a type, the growing location, harvest conditions and storage conditions, and the like. For example, with beans, it is typical to see dry beans ranging in moisture content from as low as 8% by weight to as high as 25% by weight. All of these legumes with their varying moisture contents are contemplated to be utilized in the present invention.

The water bath used in the present process may be a tank or other container typically used in the industry for soaking legumes. It may contain a drain and/or be connected to the water source by a feed so that the rate of water entering and leaving the water bath can be controlled and/or monitored. The water bath may be heated by techniques known in the art, such as by steam, hot air, heater, heating element or hot plate and the like. It is preferable that the heating be controlled. It is preferred that the heat be applied directly to the container and more preferably to the water directly, rather than the legume. Soaking can be effected by permitting the legumes to soak with or without stirring or agitation. If the water is stirred, the stirring device is one that is typically used in the industry. The water in the soak tank may be stagnant or flowing. It is preferred that the water in the bath is flowing. It is even more preferred that the water in the bath is recirculating. It is also preferred that the water bath be adiabatic.

The process of the present invention is explained in greater detail hereinbelow. However, before subjecting the legumes to the present process, as described herein, the legumes may optionally undergo preconditioning, which consists of optionally cleaning the legume by conventional methods. The preconditioning step includes a cleaning step and also may include an optional pre-soaking. Moreover, if the preconditioned legumes are subjected to both cleaning and pre-soaking, the order is not critical, i.e., the cleaning step may precede the pre-soaking step and vice versa.

If the legumes are subjected to the optional cleaning step, they are cleaned by standard techniques known in the art. Stones, metals, twigs, twine, and other foreign matter are usually removed by passing the legumes through a filter. For example, in one embodiment, they are washed, such as by spray washing, to remove the foreign material. Then they are passed over a vibrating screen cleaner, in which the beans pass through a screen, which has perforations or holes large enough for the legumes to pass through but not large enough for the stones and other large objects to pass through. Large objects are retained as the beans fall through the first screen and are caught by a lower screen. Here, in this latter screen, the perforations in the screen are very small, so that the sand and/or dirt adhering to the bean may pass through, but the legume remains on the lower screen. These legumes may then be stored or be used immediately in the steps described hereinbelow.

For purposes of this invention, "a dry clean legume" is a legume from the field or storage in which the foreign material adhered to or associated with the legume is removed before undergoing any of the method steps of the present invention hereinbelow, i.e., prior to undergoing any significant preconditioning except that which is used in the cleaning step. Unless indicated to the contrary, the term "dry legumes" refers to a legume having the moisture content of a legume naturally found in the field or in storage, bins, containers, or the like after harvesting. Finally, a "a preconditioned legume", as used herein, refers to a legume which has been subjected to cleaning and/or pre-soaking. It is preferred that the legume utilized in the present process is a dry legume. It is more preferred that the legume utilized in the present process has a moisture content ranging from about 8% to about 15% by weight. It is even more preferred that the legume used in the present process is a clean dry legume.

The legume which is preferably a dry legume is cleaned by contacting it with water from a water source. Preferably the water utilized is at about ambient temperature. Although the legumes begin hydrating in this preconditioning step, the amount of hydration may vary, depending upon various factors, e.g., the age of the legume, the storage temperature of the legume, humidity, and the like. It is preferred, therefore, that the amount of hydration in this step and in the first step of the present process is monitored and controlled. In a preferred embodiment, the legume is contacted with a sufficient amount of a water source (for preconditioning) for a sufficient period of time to produce substantially clean legumes. The legume can be contacted with a water source (for preconditioning) by any method known to the skilled artisan. Examples of useful methods include, but are not limited to, spraying, immersion, repeated dipping, misting, floating, diffusion, steam condensing or combination thereof, with immersion being the most preferred. The preconditioning is effected at a temperature less than or equal to the first temperature and most preferably at ambient temperature.

Of course, the amount of preconditioning water source used and the period of time necessary for the legumes to be in contact with the preconditioning water source to produce the preconditioned legumes will vary depending upon the particular method used to contact the legumes with the preconditioned water source. Preferably, the ratio of preconditioning water source to legumes is at least about 2:1 to about 4:1 and more preferably from about 2.5:1 to about 3.5:1. Also, preferably, the legumes are contacted with the preconditioning water source for a period of time in the range of from about 1 to about 30 minutes and more preferably from about 2 to about 20 minutes and more preferably from about 2 to about 10 minutes.

The degree of turbulence in the preconditioning step affects the rate of hydration. An excessive rate of hydration during preconditioning can cause cracking. The rate of water flow around the legume in the preconditioning step can affect the texture and especially the amount of cracking in the legume product after cooking. For example, an excessive rate of turbulence increases cracking in the legumes after cooking. It is preferred that in the optional preconditioning step, the rate of flow of water around the legume has a Reynold's number value less than about 2300.

The preconditioned legumes are next subjected to the process of the present invention.

In the first step of the present process, after the optional preconditioning step(s), the legumes are soaked and rehydrated in a water bath at the temperature described herein under conditions effective to produce a rehydrated legume having a moisture content which is at least 50% by weight of that of a fully hydrated legume.

As used herein, the term "full hydration" or "fully hydrated" or any synonym thereof, in reference to legume refers to the moisture level obtained by the legume after soaking in water for four hours at ambient temperature in water containing 90 ppm calcium carbonate.

As used herein, the moisture content of a 100% fully rehydrated legume is the amount of water by weight of a dry clean legume that is obtained after the legume is soaked for at least 4 hours at ambient temperature in 90 ppm calcium carbonate water. The moisture content of the legume at 100% rehydration can be easily determined. A sample of clean dry legumes of known weight, such as 400 grams, is placed in a water bath containing 90 ppm $CaCO_3$. The sample is completely immersed in the water and is soaked at ambient temperature for at least 4 hours. When the soaking is completed, the legumes are drained, i.e., the water is removed from the surface of the legume, e.g., bean, by draining or any other technique commonly used by the ordinary skilled artisan. The moisture content of the legumes in the water bath is determined by art recognized techniques and an average determined to obtain the average moisture content per legume at full hydration. This is the value used to measure the moisture content of a fully hydrated legume.

The water utilized in step 1 is clean and has the characteristics described hereinabove.

The legumes are preferably substantially immersed in the quiescent water bath. Sufficient amount of water is present in the water bath to effect the increase in moisture content of the legumes in the bath. More specifically, the weight ratio of water to legume is sufficient to rehydrate the legumes to attain the moisture levels described herein. Preferably, the weight ratio of water to dry legumes in step 1 ranges from about 1:1 to about 10:1, and more preferably from about 1:1 to about 8:1 and most preferably from about 2:1 to about 4:1.

As indicated hereinabove, the legumes are subjected to a first temperature, the temperature of the water bath being greater than or equal to ambient temperature but less than the critical rehydration temperature. The legumes are soaked in the water bath at the preferred temperatures under conditions effective to rehydrate the legume so that the moisture content of the legume is at least 50% of a fully hydrated legume.

As used herein the term "critical rehydration temperature" is that temperature at which dry legumes soaked in water weigh less than an identical batch of dry legumes soaked in the same water bath at a lower temperature. The critical rehydration temperature is characteristic of each species of legume. For example, the critical rehydration temperature for navy beans, as shown hereinbelow, is about 130° F. However, this value may be the same or different for another type of legume.

The critical rehydration temperature is either known or can be easily determined experimentally. For example, it can be determined by placing a sample of known quantity of dry cleaned legumes (e.g., 400 g) in a known volume (e.g., 2000 ml) of fresh soft water containing 90 ppm calcium and soaking the legumes for 30 minutes at various temperatures ranging from ambient temperature to about 200° F. After soaking for thirty minutes at each temperature, the water is removed from the surface of the legume (e.g., by draining or any other techniques commonly used by the skilled artisan), and the legumes are weighed. The inventors noted that the weight of the 30-minute soaked legumes increases with increasing temperature until the critical rehydration temperature is attained. At the critical rehydration temperature, the weight of the 30-minute soaked legumes is less than the weight of an initially identical batch of dry legumes soaked at a temperature lower than the critical rehydration temperature. Thus, the lowest temperature at which this loss of weight in the legume is observed is the critical rehydration temperature.

The following illustrates the concept. 400 g of dry navy beans were soaked at various temperatures in 90 ppm $CaCO_3$ water for 30 minutes. The weights were measured at the various temperatures.

The values are tabulated hereinbelow:

| SOAK WATER TEMP ° F. | WEIGHT OF 400 g DRY NAVY BEAN AFTER 30 MINUTES SOAKING |
|---|---|
| 125 | 730 |
| 128 | 742 |
| 130 | 718 |

Since the weight of the navy beans at 130° F. is less than the weight at 125° F. and 128° F., it is readily apparent the data that about 130° F. is the critical rehydration temperature of navy beans.

Thus, the legumes are subjected to a temperature ranging from at or above ambient temperatures to a temperature less than the critical rehydration temperatures. Without wishing to be bound, it is believed that the critical rehydration temperature is the temperature at which new cell wall structure in the legume begins to form.

In a preferred embodiment, it is preferred that the temperature of the water bath ranges from about 90° F. to about 5° F. below the critical rehydration temperature of the legume and more preferably from about 95° F. to about 7° F. below the critical rehydration temperature of the legume. It is even more preferred that the temperature of the water bath is heated from about 35° F. below the critical rehydration temperature to about 5° F. below the critical rehydration temperature and more preferably from about 25° F. below the critical rehydration temperature to about 7° F. below the critical rehydration temperature and most preferably from about 20° F. below the critical rehydration temperature to about 10° F. below the critical rehydration temperature. For instance, for legumes, e.g., navy beans, it is preferred therefore that the temperature of the water bath in the first step ranges from about ambient temperature to 130°, and more preferably from about 95°F. to 125° F., and even more preferably from about 105° F. to about 123° and most preferably from about 110° F. to about 120° F.

The soaking in the first step may be effected at one temperature such as, for example at 115° F. or at more than one temperature, as long as the maximum temperature does not exceed the critical rehydration temperature, e.g., in legumes, e.g., navy beans, the maximum temperature should not exceed about 130° F. Thus, in this first step, soaking may be effected at two different temperatures, e.g., 95° F. and 123° F. As used herein when using the term first temperature, it is to be understood that the term encompasses one temperature or a plurality of temperatures within the specified range.

The amount of time required for the first step is dependent upon general factors, including, but not limited to the temperature of the water bath, the type of legume, age of the legume, storage condition of the legume and the like. Nevertheless, the soaking is conducted at this first temperature under the conditions described hereinabove until the moisture content of the legumes is at least 50% of that of an identical batch of fully hydrated legumes. It is preferred that the legumes, especially navy beans, are soaked at the first temperature for about 10 minutes to about 90 minutes and more preferably from about 45 minutes to about 70 minutes.

The soaking is conducted at the first temperature under the conditions described hereinabove until the legumes attain a moisture content of at least about 50% by weight of that of a fully hydrated legume, as defined herein, and more preferably at least about 60% by weight of that of a fully hydrated legume, and even more preferably at least about 75% by weight of that of a fully hydrated legume and especially at least about 80% by weight of a fully hydrated legume, more especially at least about 85% by weight of a fully hydrated legume and most preferably at least about 90% by weight of that of a fully hydrated legume. The moisture content may be up to about 100% by weight of a fully hydrated legume, as defined herein. Preferably, the moisture content of the legume so treated ranges from about 60% to about 99% by weight of a fully hydrated legume and more preferably from about 85% to about 99% by weight of a fully hydrated legume and most preferably from about 87% to about 97% by weight of a fully hydrated legume. For example, in some legumes such as navy beans, full hydration is achieved when the moisture level is within the range of 48%–60% by weight of the legume. The inventors have determined that in legumes, especially the genuses mentioned hereinabove, including the genus Phaseolus, (e.g., pinto, navy beans, Great Norther bean and the like) and the genus Vigna, (e.g., black eye beans the like), the critical rehydration moisture level ranges from about 40% to about 65% by weight and more preferably from about 50% to about 60% by weight and most preferably from about 52% to about 58% by weight of the legume. Thus, it is preferred that in the first step, the moisture content of the legume is increased to at least 35% and less than about 60% by weight, more preferably from about 40% by weight to about 58% by weight. In a more preferred embodiment, the moisture content is at least 45% by weight of the legume, and most preferably from about 50% to about 58%.

The present inventors have developed another method for determining the time that the first step is conducted.

More specifically, the inventors have noted that the rehydration of the legumes occurs in two noticeable phases. When the legumes are soaked at a constant temperature, initially, the moisture content of the legume increases quickly, but at a certain level, the moisture content of the legume begins to level off. The rate of increase of the moisture content of the legume in the first phase is substantially greater than that of the second phase. If a plot is made of moisture content of the legumes versus soak time, it is readily seen that the rate of increase of the moisture content in the first phase is substantially linear. When the moisture content reaches a critical moisture level, then the rate of increase in the moisture content begins to change to a value which is substantially smaller than that in the first phase. Surprisingly, the rate of increase of the moisture content in the second phase is also linear starting from the transition critical moisture level, but the slope of this line is not as steep as that of the first phase. More specifically, the slope of the rate of increase of the moisture content in the second phase is relatively small; in fact, although it is not horizontal, its slope is substantially or very close to zero. On the other hand, the slope of the first line representing the initial rate is substantially steeper. The inventors have determined that the transition point wherein the rate (increase of moisture content per unit time) changes is a critical parameter in this embodiment and have termed it as the critical moisture level, i.e., the minimum moisture level that the legumes must achieve before the second step of the process described hereinbelow is commenced. This critical moisture level corresponds to the critical rehydration level. Inasmuch as the change in weight of the soaking legumes is proportional to the increased moisture content of the legumes, this same phenomenon may be illustrated by plotting time versus the weight of legume. For example if 400 g dry pinto beans are soaked at 115° F. for 148 minutes, one obtains the following data:

| Time (min) | 6 | 24 | 41 | 58 | 76 | 94 | 112 | 129 | 148 |
|---|---|---|---|---|---|---|---|---|---|
| Weight (g) | 402 | 438 | 486 | 524 | 576 | 612 | 662 | 688 | 716 |

Plotting weight versus time, it is noted that the line is relatively linear until 112 minutes, and then the slope begins to change. Thus, the moisture level at 112 minutes is the critical moisture level for pinto beans at 115° F.

When the moisture level reaches at least 50% of full hydration by weight or at least about 40% by weight of the legume, then the first step is completed.

The first step also affects the textural quality of the legume. In a preferred embodiment, the soaked, uncooked legume is noticeably softer, relative to the dry legume.

The inventors have noted that simultaneously with the attainment of the critical moisture level or shortly thereafter soluble solids, e.g., oligosaccharides and other sugars, such as fructose, sucrose, and the like, begin to diffuse from the legume. As a result the inventors have noted that the brix of the water bath in which the legumes are soaking increases. The inventors have also noted that prior to attaining the critical moisture level, the brix of the soak water is constant. It is preferably about zero. However, after attaining the critical moisture level, the inventors noted that the brix value increased to a value greater than zero.

Thus, one indirect method for determining the length of time it takes to achieve the critical moisture level is to monitor the brix of the soak water containing the soaking legumes. The inventors have found that legumes do not release the soluble solids until the critical moisture level is achieved.

Thus, in one embodiment of the present inventors, the legumes are subject to the first temperature until the critical moisture level is attained.

The present inventors, however, have devised a test which indicates the length of time that the legumes are maintained at the first temperature which is based upon the brix of the water bath in which the legumes are soaked. More specifically, in this embodiment of the present invention, the legumes are maintained at the first soak temperature until a change in the brix is noted. When there is a measured increase in brix level, then in this embodiment the first step is terminated and the second step is commenced.

Without wishing to be bound, it is believed that the change in the brix represents the initial diffusion of the solids, such as oligosaccharides and other sugars, such as sucrose and fructose, and the like, from the legume into the water bath in which the legumes are soaking.

Thus, when the legumes are first subjected to the present process, the brix of the soak water is measured and monitored. The brix of the soak water is periodically measured until there is noted an increase in the brix level. When this occurs, the soak temperature is then raised to the second temperature, as defined herein.

The inventors have noted, however, that a large difference in temperature between the first and second temperatures may subject the legumes to unnecessary stress which results in increased cracking of the legumes, such as beans, after cooking. To minimize the stress and to avoid a dramatic temperature change, prior to raising the temperature of the soak water to the second temperature, the soak water is optionally raised to a transition temperature, which transition temperature is between the first and second temperatures. The soak water is maintained at this temperature at least until thermal equilibrium is established. At thermal equilibrium, the temperature of the legume is the same as the soak water. Typically, when the soak water is heated quickly, the temperature of the legume lags behind the temperature of the soak water with the temperature outside the legume being warmer than inside the legume. However, if the soak water remains at a constant temperature for a sufficient period of time, the temperature of the outer surface of the legumes will be the same temperature as the soak water and the temperature inside the legume is the same as the outer surface of the legume and thus is the same as that of the soak water. The amount of time it takes for thermal equilibrium to be obtained depends on various factors, including, without limitation, the bean type as well as the size of the legumes. Moreover, to minimize the soak water having areas which are of non-uniform temperature, it is preferred that the water in the soak tank is flowing or mixed, rather than being stagnant.

Obviously, there is a minimum amount of time required to achieve thermal equilibrium. On the other hand, theoretically, there is no maximum time; once thermal equilibrium is obtained, maintaining the temperature of the water bath at one temperature for too long a period of time makes the present process less efficient. The present process is preferably maintained at the transition temperature for a time sufficient to minimize stress, and temperature shock to the legume and minimize cracking of the legume (cooked bean).

The transition temperature is preferably greater than about 130° F. and less than about 150° F. The legumes preferably remain at the transition temperature for at least 15 minutes and no longer than 2 hours.

The transition temperature may be more than one temperature, as long as the values of the transition temperature are greater than the first temperature and less than the second temperature.

However, it is critical that the step 1 and transition temperatures be within the temperature ranges described hereinabove. Heating the legumes to a higher temperature will have an adverse effect resulting in a product that does not have the characteristics described hereinabove.

In an alternative optional step, the temperature of the water bath is increased slowly to avoid temperature shock to the legumes. The soak water is heated at a rate sufficiently slow to minimize stress to the legume and to minimize cracking of the legume after cooking. It is preferred that the temperature of the soak water be raised no faster than about 5° F./min and more preferably no faster than 3° F./min and most preferably no faster than 2° F./min.

In step two of the process, the legumes in the soak water are heated to a second temperature, which is higher than the first temperature and about or greater than the endogenous oligosaccharide-reducing enzyme inactivation temperature. Preferably, the second temperature is also below blanching temperatures and less than maximum starch gelation temperatures. The legumes in the second step are subjected to the conditions described herein to increase the moisture levels of the legume to greater than that obtained at full hydration. Preferably, the moisture content of the legume ranges from about 101% to about 120% by weight relative to a fully hydrated legume, and more preferably from about 105% to about 115% relative to a fully hydrated legume and most preferably from about 107% to about 113% by weight relative to a fully hydrated legume. It is preferred that the moisture content of legumes, such as navy beans after this step in the process is greater than about 56%–60% by weight.

As used herein with respect to the second temperature, the term "about" when used with the "enzyme inactivation temperature" refers to the temperature of the soak water being within a few degrees thereof. As explained hereinbelow, the enzyme inactivation temperature is either known or can be determined, as explained hereinbelow without an undue amount of experimentation.

The second temperature may thus be below or above the enzyme inactivation temperature, for example, but only by a few degrees. It is preferred that the second temperature is no more than 15° F. above this enzyme inactivation temperature and more preferably no more than about 10° F. above this enzyme inactivation temperature and most preferably no more than about 5° F. above this enzyme inactivation temperature. If the second temperature is below the enzyme inactivation temperature, it is preferred that the second temperature be within 5° F. below the inactivation temperature of the enzyme and more preferably no more than about 3° F. below the inactivation temperature of the enzyme. It is preferred that the second temperature is at the enzyme inactivation temperature or above the enzyme inactivation temperature by no more than about 10° F. It is even more preferred that the second temperature is at the enzyme inactivation temperature or no more than about 5° F. above the enzyme inactivation temperature.

For purposes of this specification, the endogenous oligosaccharide-reducing enzyme inactivation temperature is that temperature in which the enzyme is substantially inactive after being exposed to that temperature for at least 4 hours.

The enzyme inactivation temperature for the endogenous oligosaccharide reducing enzyme for each species of legume is either known or is very easily determined experimentally. For example, one such protocol is as follows. A sample of known weight, for example, 400 g, of dry legume is soaked in a known volume of fresh soft water, e.g. 1600 mL, at various temperatures between ambient and 200° F. for at least 4 hours at each temperature. At the end of the prescribed time, the legumes are drained and the total oligosaccharide content in the legume is determined. As the skilled artisan expects, the percent by weight of remaining oligosaccharide in the drained legumes after at least a 4 hour soak at said inactivation temperature will be significantly greater than the percent of remaining oligosaccharide from the same batch of dry legumes soaked at a temperature just below the inactivation temperature. Those skilled in the art recognize that a naturally occurring enzyme system is most active across a narrow range of temperatures just below the inactivation temperature. As used herein, the inactivation temperature is the first temperature greater than the highest temperature in the most active temperature range at which the enzyme becomes increasingly inactivated, that is, the difference in value in % oligosaccharides remaining in the legume at a temperature just below the inactivation temperature and the activation temperature is significant. For example, when the inactivation temperature of the naturally occurring oligosaccharide-reducing enzyme in navy beans (which, without wishing to be bound, is believed to be α-galactosidase) was investigated, the results are tabulated hereinbelow. For purposes of illustration, the % oligosaccharides in the legume were measured after different times to show the generality of the trend:

| SOAK TEMP ° F. | % OLIGOSACCHARIDES REMAINING IN NAVY BEANS AFTER SOAKING | | |
|---|---|---|---|
| | 4 hours | 7 hours | 24 hours |
| 100 | 1.19 | 1.02 | .36 |
| 110 | 1.04 | .79 | .18 |
| 120 | 0.81 | .42 | .06 |
| 130 | .41 | .22 | .10 |
| 140 | .30 | .24 | .11 |
| 150 | .37 | .31 | .26 |

For navy beans, as shown by the data, the optimum activity range for the endogenous oligosaccharide reducing enzyme is from 120° F. to less than 150° F. Between 140° F. and 150° F. in all three cases, the oligosaccharides remaining in the navy beans increased dramatically, and that was the first time in this set of data that such a dramatic increase in the % of oligosaccharide was observed. The enzyme inactivation temperature for navy beans, based on the above data, is between 140° F. and 150° F.

The upper temperature for this step is the maximum starch gelation temperature. These values are either known to the skilled artisan or can be easily determined using techniques known in the art. See, e.g., the Ph.D. Thesis of Yong Soo Chung, 1996, submitted to Michigan State University, pp. 60–64 and the article by Schoch and Maywald, in *Cereal Chem.*, 1968, 45, 564–568, the contents of both of which are incorporated herein by reference.

In a preferred embodiment, the water bath in the second step is heated to a temperature ranging from about 140° F. to about 165° F. and more preferably from about 143° F. to about 160° F. and most preferably from about 145° F. to about 155° F.

As with step one hereinabove, the legumes in step two may be subjected to more than one temperature in the temperature range indicated hereinabove, as long as the temperatures do not exceed the upper and lower limits. As defined herein, when referring to the second temperature, it is to be understood that the term encompasses one temperature or a plurality of temperatures within the temperature range, as defined herein.

The legumes are subjected to the conditions described hereinabove in step two for a period of time effective so that the moisture content of the legumes is within the prescribed ranges indicated hereinabove. The preferred length of time in Step 2 is as short as possible. The legumes are soaked for a time sufficient to achieve the moisture levels indicated. Alternatively, the legumes are soaked at the second temperature to maximally swell the legume and to enhance internal porosity thereof.

Preferably the legumes will achieve the above-identified moisture levels after soaking under the conditions described in the second step in about 15 to about 60 minutes and more preferably from about 30 to about 50 minutes; however, times may vary by the type of legume.

Without wishing to be bound, it is believed that in this second step, the legumes generate significant internal open volume by swelling to create and enhance internal porosity. As a result, it is believed that the protein structure around the starch in the legume has less of a tendency to coagulate, encapsulate or aggregate, thereby permitting the starch granules to have unhindered access to water. Thus, they can more fully swell during subsequent cooking. Consequently, crystalline discrete starch particles in the legume, which are not digestible by the mammals, are maximally converted to amorphous starch granules which are digestible by mammals. It is to be noted that not all of the starch in the legume is gelatinizable, however, by subjecting the legumes to these conditions described hereinabove in the first and second steps, the gelation of substantially all of the starch granules which are gelatinizable is maximized.

Without wishing to be bound, it is also believed that by raising the temperature of the soak water bath to the second temperature creates a sufficient shock to the legume to disrupt the internal cell walls and not weaken the skin membrane.

Without wishing to be bound, it is believed that soaking at the first temperature, e.g. 115° F., releases phytic acid and phosphate and accelerates weight gain. The legume thus swells at the fastest possible rate without creating pectate structure or activating the phytase enzyme. In the transition step (or if no transition step at the end of step 1), the phytase is inactivated and the beans are further swelled as calcium pectate structure is formed. The rate of this swelling is maximized, without inducing excessive cracking. Soaking at the second temperature, as defined herein, e.g., 145–155° F., accelerates sugar leaching of the legume. It is believed that changes in the sugar content and the weight of the legume materially affect the porosity of the legume. However, the objective is to minimize the time at the temperatures in steps 1 and 2. It is believed that too much time at the first temperature releases too much acid, thereby promoting premature protein coagulation. The balance is between excess premature protein coagulation and increased porosity.

The process parameters described hereinabove enhance starch gelation. However, at this stage, there is minimal oligosaccharide reduction. When the brix of the soak water is found to increase in the first step or transition step, and in every step in the process after that, oligosaccharides and other sugars, such as fructose and sucrose, and the like are diffusing out of the legume into the soak water. Simultaneously therewith, the oligosaccharide reducing enzyme present in the legume is also hydrolyzing the oligosaccharides in the legume into simple sugars, which products are also diffusing out of the legume. Thus, there is some oligosaccharide reduction in the process that occurs during the transition step and legume step two of the process.

In accordance with the present process, the oligosaccharide concentration in the legume may be reduced to desired levels, although it is preferred that the oligosaccharide concentration in the legume is not reduced to minimal levels, that is, the concentrations of oligosaccharide remaining in the legume at the end of the process is greater than 0.5% by weight of the legume. To achieve lower levels of oligosaccharides than that achieved after step 2, there is an optional third step in the present process. Optionally, prior to blanching, the legumes prepared from the second step are heated to a third temperature which is greater than the first temperature but less than the inactivation temperature of the naturally occurring oligosaccharide reducing enzyme as defined herein. If the second temperature is greater than or equal to the inactivation temperature of the naturally occurring oligosaccharide, the third temperature is less than the second temperature. If the second temperature is less than the inactivation temperature of the enzyme, the third temperature may be the same temperature as and more preferably less than the second temperature. Preferably, in this optional step in the process, the temperature is lowered to a temperature to permit the naturally occurring oligosaccharide-reducing enzyme in the legume to digest the flatulence-causing oligosaccharides. Thus, the soak water is heated to a temperature which is effective for the naturally occurring oligosaccharide-reducing enzyme to digest the flatulence-causing oligosaccharides in the legume. It is preferred that the digestion occurs at the enzyme's maximum rate. The inventors have found that the preferred temperature of this optional step ranges from about 125° F. to about 155° F. and more preferably from about 135° F. to about 150° F., with the most preferred temperature being about 143–147° F. As with the first step, the effective temperature may be one temperature or more than one temperature, as long as the maximum temperature is less than the inactivation temperature of the naturally occurring oligosaccharide reducing enzyme. Thus, when referring to the third temperature herein, it is to be understood that the third temperature may be one temperature or a plurality of temperatures, within the temperature range as defined herein. The oligosaccharides in the legume are reduced to desired levels. Preferably, they are reduced to levels found in commercial products sold in the U.S., e.g., ranging from about 0.2% to about 1.0% by weight of the legume.

The oligosaccharide is determined by techniques known in the art, such as those described hereinbelow.

The legume may next be optionally blanched under effective blanching conditions. The present inventors have found that the blanching temperature is below the boiling point of water. Preferably, if conducted, the blanching is performed at temperatures above the first and second temperatures. Preferably blanching is effected at temperatures ranging between about 160° F. to about 210° F. and more preferably from about 165° F. to about 190° F., and most preferably from about 170° F. to about 185° F. These temperatures are maintained for a time sufficient to ensure that the entire legume is maintained at that temperature. The legumes are preferably blanched for a period of time in the range from about 1 to about 20 minutes, and more preferably from about 2 to about 10 minutes and most preferably from about 3 to about 7 minutes. The legumes after the blanching step are firmer than prior to this step. Blanching may be effected at one temperature or more than one temperature within this range. Thus, the third temperature also encompasses one temperature or a plurality of temperatures, as defined herein.

It is believed that during the blanching step, many different phenomena are occurring. More specifically, without wishing to be bound, it is believed that in the blanching step, the pectin methyl esterases (PME) are denatured and rendered ineffective. As described hereinbelow, PME catalyzes the reaction of calcium with the endogenous pectin present in the legume, in both the skin and meat of the legume, forming calcium pectate cross-links. These cross-links are impermeable to water and form a barrier that inhibits migration of material to and from the legume. Moreover, it is believed, without wishing to be bound, that PME catalyzes the formation of calcium crosslinks on the outside of the starch granule, thereby also preventing the starch granules from fully gelatinizing. Thus, by denaturing the PME, it is believed, without wishing to be bound, that the starch granules can more freely swell with less hindrance.

Without wishing to be bound, concurrent with the PME denaturation, it is believed that two other reactions of significance occur, continuing starch gelatinization and protein coagulation. Without wishing to be bound, it is believed that during the blanching step, the starch granule continues to swell as it transitions from a crystalline granule to an amorphous gel, making the legume more digestible. In addition, it is believed, without wishing to be bound, that protein coagulation occurs concurrently or shortly thereafter. This protein coagulation is important in preventing the starch from excessively leaching out of the legume during the retorting/cooking operation. There may be some starch leach from the legume during the preservation process, however, the conditions of this process are such so as to prevent an excessive amount of starch to leach from the legumes. During blanching, the legumes are also subjected to a temperature effective to coagulate a sufficient amount of protein to prevent an excessive amount of starch from leaching out of the legume during the cooking step.

The legumes may be optionally subjected to surface treatment to improve skin and meat texture. This surface treatment can be performed during any one of the steps hereinabove, or after steps 1 or 2 or the transition step or optional step before blanching or during blanching. For example, the legumes, during the process described hereinabove, may be rinsed with water containing conventional chelating agents, such as alkali metal salts of ethylene diaminetetraacetic acid (EDTA), alkali metal metaphosphate, alkali metal pyrophates, or tripolyphosphates or citric acid or alkali metal salts thereof. The inventors have found that the chelating agents enhance the texture of the legume, and improve the organoleptic properties, including the meat and skin texture, the meld, and the like. Without wishing to be bound, it is believed that the outer skin membrane is softened by the phosphate or other metal chelating agent which enhances mass transfer through the membrane and thus reduces the time to eliminate flatulence-causing oligosaccharides from the legumes. Preferably, the chelating agent is present in the rinsing water in concentrations of from about 0.1 to about 5% by weight and more preferably from about 0.2% to about 2% by weight. Preferably, the legumes are rinsed with the water containing the chelating agents for a time sufficient to achieve the desired texture, e.g., from about 4 to about 180 minutes, more preferably from about 12 to about 60 minutes and most preferably from about 15 to about 30 minutes. The range of time varies with the concentration of the metal chelating gent and in which step the chelator is added.

It should be noted that prior to the preservation process described hereinbelow, the calcium sequestering agent is rinsed off the legumes. This can be effected by changing the soak water, transferring the legumes in a pumped water loop and. the like, or by actually rinsing the legumes before the preservation step.

The use of the metal chelating agent provides a legume in which the organoleptic properties match that of commercially processed legumes, e.g., canned or frozen legumes. These legumes so treated have the color, appearance, texture and taste of commercially sold legumes in the United States.

During chewing of the legume, the legume skin can separate therefrom. Loose skins have a particularly unappealing mouth feel. When chelating agents are used, the skin achieves a texture indistinguishable from the meat, as determined by trained sensory panelists and the overall taste and organoleptic properties of the legume are enhanced.

In a preferred embodiment, the chelating agent, such as metaphosphate, is dissolved in aqueous solution, such as water and is added to the soak water in Step 1. In this embodiment, it is found that the addition of chelating agent in step 1 increases the rate of hydration. It is preferred that the concentration of the chelating agent used in Step 1 ranges from about 0.5% to about 2.5% by weight of solution and more preferably from about 0.75% to 1.5% by weight of solution and most preferably at about 1% by weight of solution. In addition, it is preferred that the amount of chelating agent added to the soak water ranges from about 3 to about 5% per gram of legume.

Surprisingly, if the addition of chelating agents occurs after the optional preconditioning step and during Step 1, the rate of bean rehydration increases more than 50% in the first half hour of soaking. Without wishing to be bound, it is believed that the addition of the chelating agent increases the bean porosity.

In addition, additives conventionally used in this art may be added to the soak water or rinsing water in any or in all of the steps described hereinabove. For example, the pH of the soak water in any one of the steps may be controlled to a certain level, e.g., as in step three wherein the pH of the soak water is about 5.5 to 9.0. Depending on the value selected, this value may be attained directly with the addition of buffers conventionally used in the art.

Moreover, the soaking water in the steps 1 and 2, the optional transition step, or in the optional step subsequent to the second step and prior to blanching, may contain additional optional ingredients normally used in this art in preparing legumes, e.g., trace amounts (about 0.01 to about 0.05%) of a reducing agent, such as sodium or potassium salt of sulfite or bisulfite, cysteine, ascorbic acid, sodium mercaptoglycolate and combinations thereof, coloring agents, and the like. Alternatively, these agents may be added to the sauce described hereinbelow.

It is to be understood that the present process encompasses the addition of any one of the conventional additives described hereinabove or a combination of conventional additives to either the soaking water or to the rinsing water.

During the present process described hereinabove, the present inventors have found that the water may be changed during and after any step of the present process. It is preferred that the soak water is changed at least once.

If the water is changed in the preconditioning step or during blanching, it is preferred that hard water be used because the calcium content of the hard water gives the legume added firmness. Alternatively, calcium can be added to the sauce or other vehicle prior to or simultaneous with forming a legume-based mixture in a later step to achieve the desired firmness, as described hereinbelow.

It should also be noted that if the water is changed or added to the soak tank in any of the other steps, e.g., step 1, step 2, the optional transition step or the optional step between step 2 and blanching, soft water is preferably utilized.

Following the procedure described herein, substantially all of the gelatinizable starch in the legume is gelatinized. As a result, the legumes are substantially more digestible by the mammal than non-treated legumes. Thus, the flatulence of the legumes is reduced.

The legumes are next subjected to conditions sufficient to preserve the legumes, as described hereinbelow by standard techniques known in the art.

The usual type of preservation includes canning, freezing, drying, and the like. Initially the legumes so prepared are combined with a vehicle, as defined hereinbelow and mixed with optional ingredients, depending on the purpose, using standard techniques in the art. The legumes may also be used whole or crushed or mashed or dehydrated using techniques known in the art. Nevertheless, regardless of the preservation technique, the legumes are typically combined with a vehicle to produce a legume-containing mixture. The mixture may additionally contain foods typically included in such mixtures, e.g., meat, vegetables, and the like. Of course, the amount of legumes in the legume-containing mixture will depend upon the particular product being produced. Examples of legume-containing products that can be prepared by the process of the present invention include, but are not limited to, pork and beans, vegetarian beans, hot dog and beans, sausage and beans, chili with beans, baked beans, pre-cooked ingredient beans, bean salad, southern peas, bean soups, beans with meat, bean spreads, beans with cheese, beans with rice, flavored beans, beans with pasta, bean dips, bean casseroles, bean salsa, bean snacks, bean pastes, bean side dishes, bean flour, re-fried beans, bean powder, pet foods and the like; however pork and beans, chili with beans, and baked beans are preferred. The legume containing mixture preferably comprises from about 5% by weight to about 95% by weight and more preferably from about 15% by weight to about 75% by weight and most preferably from about 35% by weight to about 65% by weight of the legume produced in accordance with the present invention, with the balance being a vehicle.

When the legume-containing mixture is the preferred pork and beans, the mixture preferably comprises from about 25% by weight to about 85% by weight, more preferably from about 30% by weight to about 75% by weight, and most preferably from about 35% by weight to about 65% by weight of beans, prepared in accordance with the process described hereinabove, and the balance being the vehicle; when the legume-containing mixture is the preferred baked beans, the mixture preferably comprises from about 25% by weight to about 65% by weight, more preferably from about 40% by weight to about 60% by weight, and most preferably from about 35% by weight to about 50% by weight of beans, prepared in accordance with the process described hereinabove and the balance being the vehicle; when the legume-containing mixture is the preferred chili with beans, the mixture preferably comprises from about 10% by weight to about 40% by weight, more preferably from about 15% by weight to about 35% by weight, and most preferably from about 20% by weight to about 30% by weight of beans, prepared in accordance with the process described hereinabove, with the balance being the vehicle. These legume-containing mixtures may further comprise other ingredients, in addition to the foods described hereinabove, which are typically included in such mixtures. These type of ingredients and their relative concentrations will be known to one skilled in the art.

The term "vehicle," as used herein, refers to an edible medium that the legumes prepared in accordance with the present invention may be combined with. The vehicle can be any edible medium known to those skilled in the art. Furthermore, the vehicle may be a single component or ingredient, such as water, or may be a mixture of components or ingredients. Preferably, the vehicle is compatible with the particular legume prepared in accordance with the present invention being used. Examples of vehicles useful in the present invention include, but are not limited to, water, brine, a tomato-based sauce, a molasses based sauce, a brown sugar based sauce, chili sauce, barbecue sauce, smoke-flavored sauce, and baked bean sauce. The phrase "tomato-based sauce", as used herein, refers to the sauce used to prepare products such as pork and beans, hot dogs and beans, and vegetarian beans. The composition of such tomato-based sauce will be appreciated by one skilled in the art. The phrase "chili sauce", as used herein, refers to the sauce used to prepare chili-type products when combined with beans. The composition of such chili sauce will also be appreciated by one skilled in the art. The phrase "baked bean sauce", as used herein refers to the sauce used to prepare baked bean products when combined with beans. The composition of such baked bean sauce will also be appreciated by one skilled in the art.

The legume-containing mixture may additionally contain optional ingredients such as pork, beef, chicken, tofu or other soy derivatives, turkey, fish, spices, flavoring agents, tomato derivatives, dairy derivatives, grains, gums, starches, sugars, coloring agents, oils, salts, fruits, vitamins, vegetables, cereals, calcium sources, such as calcium chloride, phosphates, and mixtures thereof and the like. The concentration of each and all of these optional ingredients will depend upon the desired flavor profile and appearance of the final product, and will be appreciated by one skilled in the art.

The legume-containing mixture is prepared by combining the legumes prepared in accordance with the process described hereinabove with the vehicle, along with any desired optional ingredients. The ingredients may be added singularly or combined in any manner known to those skilled in the art. The preferred embodiment is to separately add each ingredient into a vessel or container. Thus, for example, the legumes prepared in accordance with the present invention, then other fresh ingredients, such as chopped onions or pieces of pork, and then the vehicle are sequentially added into a container. Another method is to add the various ingredients, separately or in combination, into an agitated tank, wherein they are stirred or agitated until the ingredients are uniformly dispersed through the legume-containing mixture. If necessary, to increase the firmness of the vegetable, sufficient calcium may be added to the legume containing mixture until the desired firmness is obtained.

After the legume-containing mixture is prepared, it is then preserved by the desired route using conventional techniques known in the art. For example, various methods known in the art are used to preserve the legume-containing mixture, such as retorting, refrigeration, irradiation, freezing, aseptic processing, microwave processing, dehydration, freezing-drying, acidification, pickling, and the like. For example, in freezing, the freezing may be accomplished by known techniques in the art, e.g., individually quick frozen techniques, freezing the legume in a container, e.g., blast freezing or immersion of the legumes into a freezing solution. In dehydration, water is removed from the legumes by applying heat thereto, using techniques known in the art, such as forced air drying, drum drying, spray drying, vacuum drying, freeze drying and the like. Heating may also be effected by solar heating techniques known in the art. It is preferred that the legumes are dried in dehydrators. In dehydration, if it is utilized, it is preferred that before dehydration, preservatives, such as sulfite (e.g., sodium sulfite or metabisulfite) be applied to any cut legume.

However, the most preferred preservation route is retorting. In this method, the legume-containing mixtures described hereinabove are charged into a container. Examples of typical containers include, but are not limited to, tin plates or steel cans with or without enamel linings or coating, aluminum cans, flexible or semi-rigid containers, glass bottles and jars, plastic bowls with or without lids, coated cartons, aluminum trays, flexible pouches, retortable containers and the like. The phrase "retortable container", as used herein, refers to a container which is capable of withstanding the temperature and conditions of a retort operation. The preferred container is the retortable container. The retortable container may be any type suitable for retort processing.

In the retorting preservation method, the legumes are thermally processed in a retortable container. More specifically, in the preferred embodiment, after the legume-containing mixture is prepared, it is charged into a retortable container, then sealed. After the retortable container is sealed, it is thermally processed. This is accomplished by heating the retortable container and the legume-containing mixture contained therein at a sufficient temperature and for a sufficient period of time to thermally process the legume. The time and temperature requirements are dependent upon the legume-containing mixture being thermally processed and the size, shape and composition of the retortable container, and the type of retort equipment used, which is easily determined by one skilled in the art.

The retort operation can be carried out in any retort equipment known to those skilled in the art. Examples of useful retort equipment include, but are not limited to, hydrostatic retorts, crateless retorts, rotary retorts, agitating retorts, and still retorts. As will be appreciated by one skilled in the art, and as already pointed out herein, the time and temperature parameters necessary to prepare the legume product will depend upon the type of retort equipment used.

Optionally, prior to retorting, the open retortable containers are filled with legumes prepared in accordance with the present invention in combination with the vehicle, and are placed on a conveyor of any suitable style and passed through an oven, as described in U.S. Pat. No. 1,718,187 to Bartlett, the contents of which are incorporated by reference. The temperature of the oven is preferably between 400° F. and 500° F. and more preferably at or about 450° F., and the legumes are subjected to the high heat of the oven for a time to sufficiently bake the legume in the open containers. Upon removal of the containers from the oven, a quantity of the vehicle is added to each container sufficient to compensate for vehicle lost by evaporation and absorption during the baking steps and sufficient to meet fill standards. The containers are next hermetically sealed and then thermally processed under retorting conditions known to the skilled artisan. Other methods for processing the legumes, sealing the container and preserving the contents thereof are described in U.S. Pat. No. 2,232,282 to Struble, U.S. Pat. No. 1,495,736 to Hadley, U.S. Pat. No. 1,548,796 to Libby, U.S. Pat. No. 2,278,475 to Musher, and U.S. Pat. No. 2,360,062 to Lannen, the contents of which are all incorporated by reference.

It is well known that retorting increases the pressure on the legumes inside the can. Moreover, it is believed that the pressure affects the extent of starch gelation. It is preferred that the pressure on the legumes in the can is such that starch gelation is maximized.

After retorting, the retortable containers are labeled and ready for distribution to the consumer.

As indicated hereinabove, the legumes may be prepared into a paste or puree. This is effected using techniques well known in the art. See U.S. Pat. No. 4,871,567, the contents of which are incorporated by reference. For example, prior to adding the legumes to the vehicle, the legumes may be crushed or mashed using techniques known in the art.

In addition, the crushed legumes may be used as is or they may be mixed with whole legumes, such as in preparing refried beans. In preparing refried beans, the beans subjected to steps 1 or 2 and any of the optional steps described hereinabove are separated into two separate streams. One stream consists of the whole beans; while the other stream consists of the beans which are to be crushed or mashed. The first stream of beans, (i.e., the beans which are to remain whole) may optionally be baked under normal baking condition.

The second subquantity of beans (beans to be crushed) are subjected to crushing using standard techniques in the art. After crushing, the second subquantity of beans may be mixed with the first quantity of beans (the whole beans) and then dried using techniques known in the art, such as that described in U.S. Pat. No. 4,871,567, the contents of which are incorporated by reference.

The legumes prepared by this invention can be used in foods fed to various kinds of mammals, including dogs, cats and other domestic and farm animals. However, preferably they are prepared for ingestion by man.

The legumes prepared in accordance with the procedures described hereinabove exhibit the characteristics described hereinabove, with legumes exhibiting very low flatulence. Additionally, the organoleptic properties of the legumes produced in accordance with the present invention match that of commercially available processed legumes, e.g., canned or frozen legumes.

The legumes produced by the present invention exhibited minimal cracking. Furthermore, in a preferred embodiment, they exhibited the appropriate texture and organoleptic properties found in commercial process and legumes sold in the U.S.

The inventors have discovered that cracking is caused by a variety of factors. Without wishing to be bound, it is believed that the amount of soaking time, and the rate of rehydration during the first step and the temperature of the first step among other factors affect cracking. However, by subjecting the legumes to the conditions described herein, the amount of cracking in the legumes formed by the present process is minimized. In addition they have found that a rinsing with metal chelating agents may reduce cracking.

The inventors have additionally noted that when the soak water in steps 1 or 2 or in the transition step or optional steps described hereinabove is changed abruptly, i.e., when the old soak water is removed completely and then replaced with fresh water, the legumes develop increased and noticeable severe cracking (splitting) in the skin after cooking and processing. Normally, per 100 legumes, e.g., navy beans, there may be about 15% by count exhibiting severe cracking. However, when the soak water is changed abruptly, the amount of cracking is raised significantly, e.g., severe cracking (e.g., 50%) has been observed. However, when the soak water is changed gradually, an abnormally high amount of cracking in the legume does not occur. Thus, in a preferred embodiment, the legumes are soaked in a soak tank which has an outlet drain for water and an inlet pipe for water to be added wherein the rate of entry of fresh soak water is controlled to minimize cracking. Without wishing to be bound, it is believed that this excessive cracking is due to the following phenomena: When the legumes are soaking in the present process, the legume is swelled with water. If at the same time, there is a considerable amount of sugar in the soak water as well as other components in the soak water, when the fresh water replaces the old water abruptly, e.g., by dumping out the water and then replenishing with fresh water, there is a considerable change in the soak water brix, e.g., from a positive amount to zero. This represents a considerable change in osmotic pressure. This abrupt change in pressure pushes excess water into the legume, swelling it even further. If the swelling rate is excessive, the bean skin stretches beyond its yield point and creates a weakness in the skin. However, cracking is minimized as the interior sugar more gradually migrates out of the legume and into the soak water.

Without wishing to be bound, it is believed that at high osmotic pressure differences, the swelling/deswelling response is so great that permanent damage is done to the integrity of the bean surface. Although the damage is not obvious to the naked eye during soaking, after being subjected to preserving conditions, such as retorting, which completes gelation swelling, the damage is visually apparent as increased fractioning of the bean. However, if the legumes, such as beans, are ultimately served as a puree or paste, the presence of cracking in the beans is unimportant, since in puree, the legume is mashed in any event, as described hereinabove.

On the other hand, if the legume is not to be mashed, then "cracking" detracts from the appearance of the legume. To avoid excessive cracking in the legume, the new soak water is added to the soak tank or container at a rate effective to minimize cracking. Preferably, the new soak water is added to the soak tank at a rate ranging from about 1%/min to about 4%/min. In this case, percent per minute means the fresh gallons added per minute divided by the total free gallons of water in the soak and balance tank system. Another way of measuring the rate is to analyze the change in soak water brix. The inventors have found that the cracking is minimized when the change in soak water brix is less than about −2.0 and more preferably less than about −1.0 per hour. When the rate of bleed-in of the new soak water is within the range indicated hereinabove, the present inventors have noted that the legumes obtained have less cracking than that obtained previously heretofore, although the actual rate bleed-in may vary for different legume varieties.

As indicated hereinabove, the operations of steps 1 and 2, the transition step, the blanching step and the optional step between the second step and the blanching step may be conducted in a soak tank conventionally used in the art. The soak tank may have a water inlet and drain. In addition, the soak tank may have the water stagnant, or the water may be stirred by conventional means or the water may be circulating. The soak tank may be a vertical soak tank typically used in the art.

In an even more preferred embodiment, the operations described hereinabove in steps 1 and 2, the transition step, and the optional step after 2, are conducted in a horizontal flow tank apparatus, as described in copending application entitled "SOAK APPARATUS FOR LEACHING SOLUBLE CONSTITUENTS FROM INSOLUBLE MATERIALS", filed concomitantly herewith, and based upon a provisional application having Serial No. 60/116, 709, the contents of which are incorporated by reference.

The horizontal soak tank apparatus is described therein. It comprises a series of screens which provide a substantially uniform flow of water through the horizontal soak tank. Moreover, the horizontal tank is optionally connected to a balance tank for temperature and flow control containing a portion of the soak water to which temperature controls are imparted, in correlation with desired processing requirements, a suitable pumping arrangement facilitates temperature-regulated water to be pumped in laminar flow through the charge of beans in the soak tank, and in continuous flow returned to the balance tank over a specified time period. This soak cycle is repeated under varied conditions, both as to temperature and time, in circulating the flow through the soak tank, until the intended amounts of solubles have been extracted from the beans, rendering the latter potentially more digestible to a consumer, while retaining the desired texture and taste of the legumes.

Figure 2:
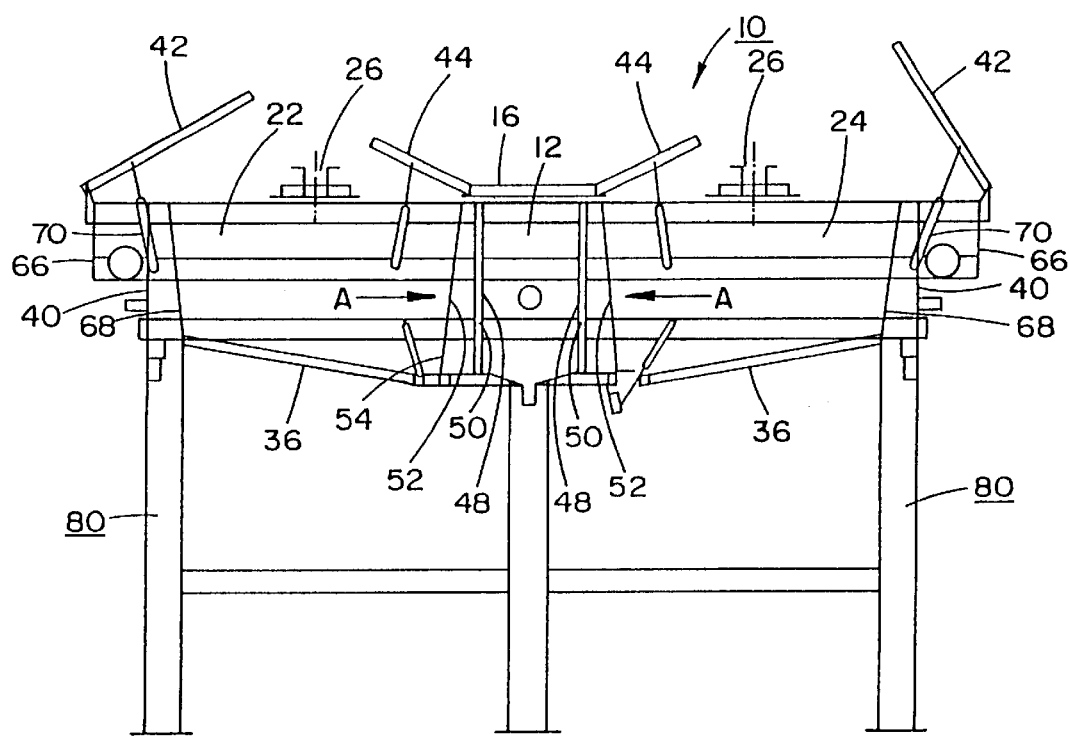
FIG. 2 illustrates a partially sectional front view of the soak tank of FIG. 1.

The apparatus is depicted schematically in FIGS. 1 and 2 and is described in more detail in the copending application referred to hereinabove. As illustrated therein, the apparatus contains a horizontal flow soak tank 10 which includes a header 12 of box-shaped configurations which possesses an inlet 14 for a soaking liquid, such as temperature-controlled water, and has a pressure holding cover 16 for maintaining a superatmospheric pressure in the header. Communicating with the opposite sides 18 and 20 of the header 12 and extending horizontally therefrom in mirror-image arrangement are a pair of hoppers 22, 24, each adapted to receive through inlets 26, a charge of legumes which are to be soaked in a continuous water flow and heated so as to extract solubles such as sugars in the form of oligosaccharides therefrom. The header 12 and hoppers 22, 24 communicate by means of a system of screens, wherein the soak tank 10 is in a continuous recirculating water flow connection with a balance tank 28 which provides a continuous flow of processing water under predetermined temperature and timing cycle conditions for effecting the treatment of the legumes.

Each hopper 22, 24 is of a generally rectangular configuration having vertically extending sidewalls 32, 34, and a bottom wall 36 which slopes at a generally upward incline away from the juncture thereof with the lower end of the header 12. As illustrated in FIG. 3A, extending along the bottom wall 36 of each hopper proximate the header lower end is a horizontal closable elongate outlet gate 38 for discharge of processed beans at the termination of the soak cycle. In a modified or second embodiment, as diagrammatically illustrated in FIG. 4, there is shown a vertically closable outlet or discharge gate 38A arrangement. The transverse end of each hopper distant from the header 12 communicates with an overflow trough 40 for reconveying the flow of water from the hoppers to the balance tank 28. The hoppers 22, 24 are each adapted to be sealed by closing covers 42 and 44.

Water is continuously introduced from the balance tank 28 into the header 12 under a superatmospheric pressure and a controlled temperature, and then passed through a system of screens communicating the header 12 with the hoppers 22, 24 so as to control the flow through the pile of beans contained in each of the hoppers of the horizontal flow soak tank. The water, after passing through the piles of beans in a generally horizontal laminar flow path is passed through dewatering screens into an overflow trough and then recirculated into to the balance tank 28, preferably by gravity flow, temperature and flow regulated in the balance tank, and again returned to the header for recirculation through the hoppers, thereby providing a continuous flow circuit.

The system of screens employed in the horizontal flow soak tank 10 provides a first set of screens between the header 12 and each respective hopper 22, 24, whereby a first vertical screen 48 converts turbulent flow of water in the header into non-laminar flow as the water passes through the screen 48. A further closely spaced screen 50, which may be parallel therewith, and wherein each screen possesses a small mesh will convert the non-laminar flow of the water into a transitional stage towards a somewhat more uniformly laminar flow as the water passes through the second screen 50. The flow then passes through a third screen 52, which may be a slotted bar screen, and functions as an end wall for each respective hopper 22 and 24, wherein flow through the screen 52 is a substantially laminar water flow extending uniformly horizontally across the width and cross-section of the tank containing the pile of beans extending towards the overflow trough. As a result of the foregoing, each bean in the pile of beans in the hopper 22 or 24 is soaked substantially uniformly to extract solubles therefrom, inasmuch as the flow of the circulating water is maintained at essentially constant levels within the hoppers of the soak tank 10.

The screen 52 is designed to separate the beans contained in the hopper from the jets of water emanating from the individual holes in the screen 50. This, in effect, enables the water jets to dissipate and become a uniform laminar plug flow during passage through screen 52. The latter is inclined relative to the vertical, so that the bottom end 54 thereof is extended forwardly to be closely adjacent the edge of the respective horizontal elongate gate 38 for discharging processed beans at the termination of the extraction of solubles. This inclined orientation of the screen 52, in conjunction with the upwardly sloping bottom wall 36 of each hopper will impart a slight upward circulation to the bottom pile of beans, ensuring a more uniform treatment thereof. This inclined orientation of the screen 52 provides a relief angle for the expansion of the bean pile as the beans rehydrate and expand in the respective hoppers. In addition, the use and location of screen 52 separates the pile of beans from the negative impact of direct impingement of the soak water media exiting from the screens 48 and 50.

Figure 3:
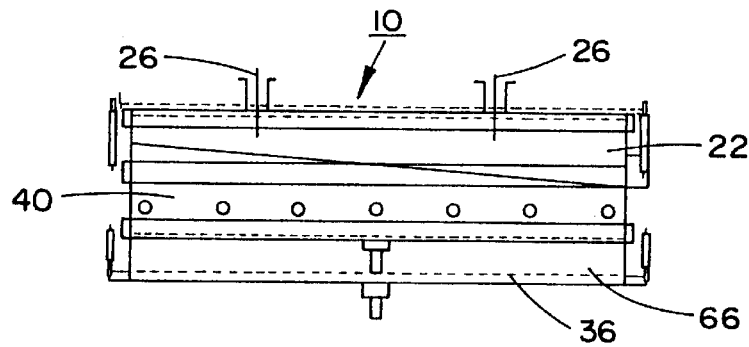
FIG. 3 illustrates an end view of the soak tank of FIG. 1.
Figure 5:
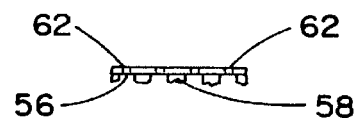
FIG. 5 illustrates a sectional view taken along line 5—5 in FIG. 4.
Figure 4:
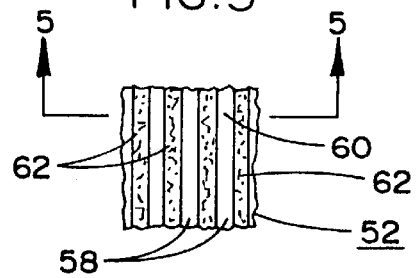
FIG. 4 illustrates a fragmentary view of a portion of the screen in the soak tank, as viewed in the direction of arrows A in FIG. 2.
Figure 6A:
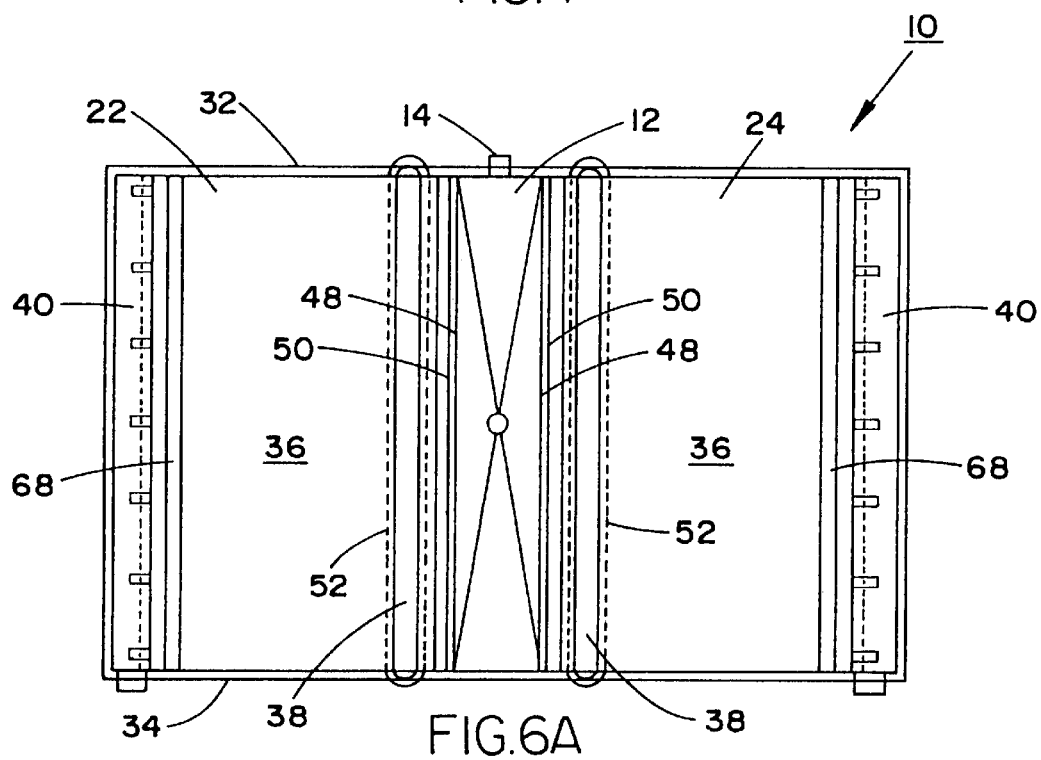
FIG. 6A illustrates, in a view similar to FIG. 1, the product discharge gates of the soak tank operating horizontally.
Figure 6B:
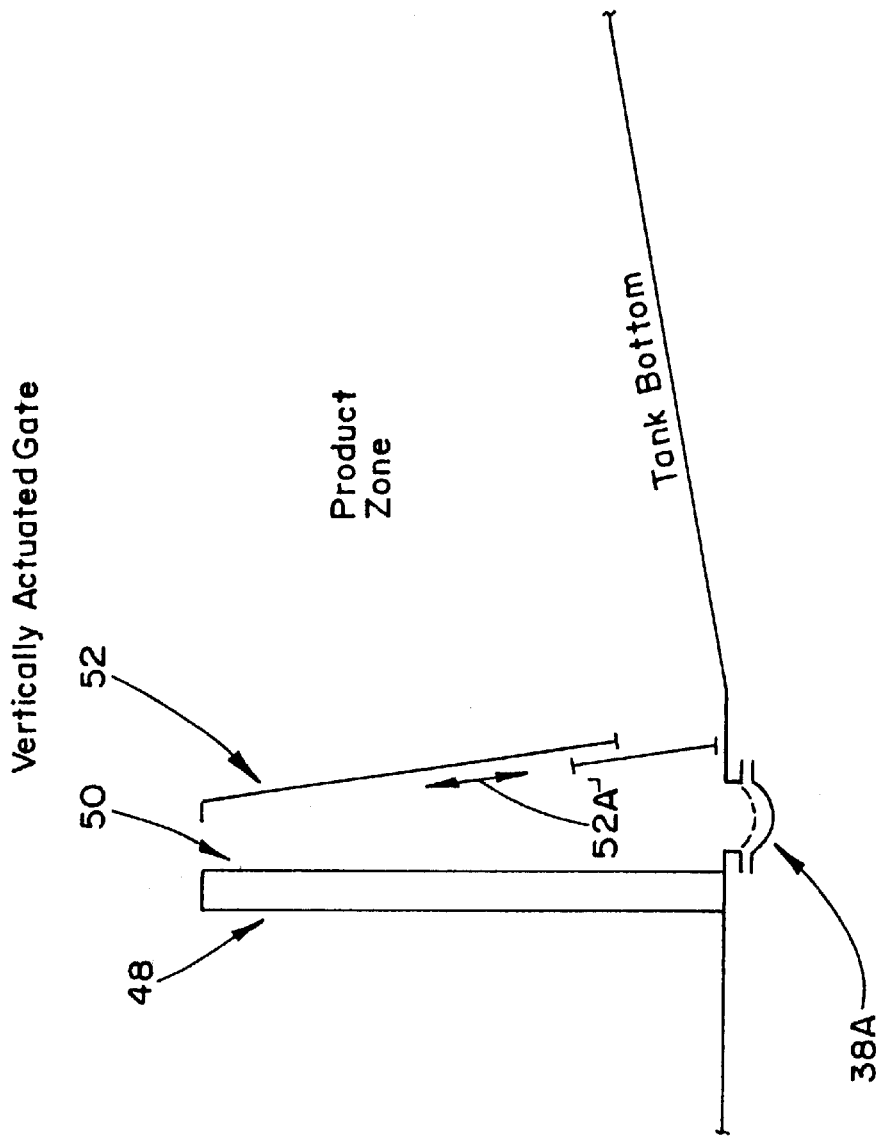
FIG. 6B illustrates, generally diagrammatically, the product discharge gates of the soak tank operating vertically.

In the alternative embodiment, as illustrated in FIG. 3, a vertically closable elongate bar screen is employed to discharge beans. Pursuant to this embodiment, movable screen 52A operates as part of upwardly angled screen 52 during processing so as to provide a relief angle during this processing of the beans. During bean discharge, screen 52A is vertically actuated to allow beans from hoppers 22 and 24 to enter the discharge area 38A.

The surface 56 of the screen 52 facing the interior of the respective hopper 22, 24, so as to form the so called slotted bar screen, is provided with closely spaced vertically extending raised ribs 58 having smooth surfaces 60 along which the beans can gently slide upwardly during circulation as the beans swell. The openings or apertures 62 in the screen 52 are located intermediate the ribs to facilitate the flow of water therethrough, while the ribs hold the beans in spaced relationship from the apertures 62 so as to prevent clogging of the latter. In essence, the pile of beans which is being soaked and processed is angled upwardly at the bottom thereof so as to cause the beans to gently lift up and thus prevent damage to the lower layers of the beans.

At the discharge end 66 of each hopper 22 or 24 there is located a screen 68 which is similar in construction to screen 52, such as a slotted bar screen, but which is inclined at a reverse angle relative thereto, so as to form a bean holding structure for the hopper, and also provides a relief angle for the bean pile as swelling takes place. A solid baffle 70 arranged interiorly of screen 68 imparts an under-overflow to the water exiting from the soak tank as it is recirculated to the balance tank 28.

In essence, the entire horizontal flow soak tank 10 may be supported on suitable support structure 80.

Located at regions within the hoppers 22, 24 containing the beans which are to be processed are a plurality of temperature sensors as probes 84 which will constantly monitor the temperature of the process water so as to enable controllers to compensate for temperature deviations in the water of the balance tank 28 which is being recirculated into the soak tank 10 and to thereby accurately regulate the processing cycle.

The operation of the soak tank system is essentially as follows:

The empty clean hoppers 22, 24 are initially filled with clean water at ambient temperature. This water may be a mix of hard and soft water, as described hereinabove.

The optionally pre-conditioned legumes are then added to the tank, wherein the amount of legumes added will vary, based on the swelling characteristics of a particular genus.

In the balance tank 28, the water is heated to the first temperature and recirculated through the legume pile in horizontal plug flow in the first step of the process to permit partial rehydration of the legume, in accordance with Step 1 described hereinabove. The water may then be heated optionally to the transition temperature.

The water is then heated to the second temperature, as described hereinabove.

Optionally, before blanching, the water is heated to a third temperature to permit diffusion of the sugar and other solubles from the legumes into the soak water and to permit the natural oligosaccharide-reducing enzyme to hydrolyze the flatulence causing sugars as described hereinabove.

Next, the legumes are optionally blanched. The legumes may be blanched in a separate blancher. Alternatively, they may be blanched in the water bath. If blanched in the water bath, the soak water is heated to blanching temperatures.

As described hereinabove, when the old soak water has a high brix, fresh soft water is bled into the recirculating water. A different number of bleed-in levels would be acceptable, wherein a preferred rate of bleed-in of fresh water is about 1.0%/min to about 4.0%/min; in essence, in a preferred embodiment fresh water is added at a volume of 2.6% of the free water in balance tank 28 plus the soak tanks 22 and 24.

The recirculating water system employed incorporates water temperature controls (not shown) using well known process control techniques. The water is recirculated by means of the balance tank 28 at a rate sufficient to cause the flow rate through the plurality of perforations in the screens to become non-laminar; but with the flow of the water through each hopper being laminar in nature.

Pursuant to a further preferred embodiment, there is provided an additional relatively large-apertured screen upstream of the small-hole screens/perforated plates or within the overflow troughs. This screen merely removes large particles, such as bean skins and other debris, which can enter the recirculating system. Accordingly, that screen acts like a prior art physical removing filter.

The water flow through the final slotted bar wire screen 52 is substantially equal in its distribution and very slow across the entire screen surface, possibly about 1 cm per second, whereas at this laminar water flow velocity the beans offer very little resistance and the flow stays substantially equal around and through the bean pile with the water eventually reaching the discharge end of the bean pile at the outermost screen at substantially the same velocity and temperature, adjusted for the change in surface area of screen 68 caused by upwardly angled wall 36.

The balance tank 28 is level-controlled, using well known control technology and discharges into a recirculating pump wherein a series of communicating valves permit bleed-out of old water, while a level controller bleeds in fresh water. A bleed-out system from the discharge side of the tank permits old water to be discharged while the level controller concurrently adds fresh water.

FIG. 7 of the drawings represents another embodiment of the apparatus in which components similar to or identical with these described in connection with FIGS. 1 to 6 are identified by the same reference numerals. Inasmuch as any absolute change in pressure in the processing cycle is small, since excessively large pressure changes can rupture the beans, normal non-pressurized vessels or tanks 10 can be employed.

Consequently, the system can be modified by the addition of a hydrostatic catch tank 90 at the discharge of the soak tank 10, with a timer-activated by-pass valve 92. Thus, when the by-pass valve 92 is closed, water is forced to flow into the balance tank, and overflow from the balance tank 28 to discharge into catch tank 90.

This process gradually fills the balance tank 28, and correspondingly gradually increases the hydrostatic head in the soak tank 10.

When the by-pass valve 92 is opened in a logical sequence, the balance tank 28 drains into the catch tank 90, lowering the soak tank pressure down to atmospheric pressure. The size of the balance tank 28 divided by the recirculation rate (volume/volume per time=time) controls the time of transition from high pressure to low pressure and back again.

Unless indicated to the contrary, the percentages used herein are by weight.

Unless indicated to the contrary, when referring to temperatures in the process, it is understood that reference is made to the temperature in Fahrenheit of the soak water in which the legumes are immersed.

Unless indicated to the contrary, the temperatures indicated herein with respect to the process steps, are those of the soak water.

The following examples further illustrate, but do not limit, the present invention.

Furthermore, in reviewing the following examples, it is to be understood that the free water in the soak tank is computed as the total volume of the soak tank apparatus minus the legume volume. The free water in the container is computed as the total volume of the container minus the legume volume container. Since water has a density of 1 g/mL the free water can also be calculated by weighing the container filled with water and the desired amount of legumes and subtracting out the weight of the container without water when the desired amount of legumes are present therein. The volume of legumes is measured experimentally.

For example, with navy beans, a small container is filled with soaked beans and weighed. The container is then filled to the brim with water and weighed a second time. The container is emptied and filled with water and weighed, for example, a 16 oz can for navy beans holds 448 ml of water. A 16 oz. can filled with only navy beans in the absence of sauce typically weighs 298 g. The volume of bean and water used typically weighs 482 g. The free water in the can is (482−298) 184 g. The free water percent in the can is (184×100)/448=41%.

The free water in the apparatus used in some of the examples described hereinbelow is calculated the same way.

For example, in an embodiment of the apparatus, the balance tank volume is 149 gallons and the soak tank volume is 206 gallons. Together the volume is 355 gallons. A typical free moisture is therefore 0.41×(206)+149=233 gallons.

Variation in bean swelling caused variations in the free moisture calculation.

In the following examples, % oligosaccharide in the legume and % starch gelation were determined using the following techniques.

(a) % Oligosaccharides

This was determined in accordance with Procedure AOAC 977.20, incorporated herein by reference, utilizing a standard liquid chromatograph having a column 300×4 (id) mm $\mu$ Bondapak/Carbohydrate. The flow rate was 1.0 ml/min and the temperature setting is at ambient temperature.

The reagents used for the mobile phase is acetonitrile diluted with water ranging from 60 parts acetonitrile/40 parts water (v/v) to 90 parts acetonitrile/10 parts water (v/v), with 70:30 acetonitrile/water being the optimum (v/v).

The standards used were fructose, glucose, raffinose, stachyose, and verbascose. One gram of each of the sugars was dissolved separately in 100 mL of water, then 4 parts of the aqueous solution was diluted with 6 parts (v/v) of acetonitrile. 20 $\mu$L of each of these solutions were injected into the liquid chromatograph to obtain the retention times.

In preparing the bean sample, about 15 g of product is weighed into a shaker cup, 100 mL of water were added thereto, and sample was shaken for at least 30 minutes to assure dissolution of sugar. Liquid samples from the beans were used as is. 4 parts of aqueous solution was diluted with 6 parts (v/v) of acetonitrile, allowed to sit for at least two minutes to assure precipitation of insolubles, then filtered and injected into the liquid chromatograph.

20 $\mu$L of sample is injected and the % of oligosaccharide present is determined by integrator values or from peak heights as follows:

weight % sugar=$100 \times PH/PH^1 \times (V/V^1) \times (W^1/W)$ where PH and $PH^1$=peak heights (or integrator values) of sample and standard, respectively; V and $V^1$=mL sample and standard solutions; and W and $W^1$=g sample of standard, respectively.

(b) Gelation

Gelatinization is reported as the percent of total starch that is enzymatically available due to heat, mechanical or chemical damage of the starch granule under conditions of the test.

Total starch is determined by AACC method 76-11, AOAC method 979.10 and AOAC method 999.16, the contents of all of which are incorporated by reference.

The reagents used in the test are:

1. 80% ethanol. Add 800 mL ethanol to a 1 liter flask, add 200 mL DI water, and mix well.

2. Phosphate buffer pH 6.0.

Add 7.7 grams sodium phosphate dibasic and 35.0 grams sodium phosphate monobasic to 2 liters of distilled water. Mix to dissolve and dilute to 4 liters. Adjust pH to 6.0 with concentrated phosphoric acid.

3. Phosphate buffer 4.3 pH. Add 43 grams sodium phosphate monobasic to 4 liters of distilled water—mix to dissolved and adjust to pH 4.3 with acid.

4. GOP—Glucose oxidase-peroxidase.

Mix together portions of the following solutions separately.

a. Solution A 1. sodium phosphate dibasic anhydrous—4.601 grams
2. sodium phosphate monobasic monohydrate—1.056 grams
3. Benzoic acid ($C_7H_6O_2$)—4.000 grams
4. 4-Hydroxybenzoic acid ($C_7H_6O_3$)—3.000 grams Dissolve these chemicals in 1800 mL water in a 2 liter volumetric flask by stirring several hours at room temperature. Dilute to mark and mix well. Adjust pH to 7.4 with 6 M NaOH. Solution is stored at 4° C., and is stable for at least 12 months.

b. Solution B

In a screw-cap test tube, weigh enough glucose oxidase so that 25,000 units are obtained. Tare the test and weigh in 2.0 grams of finely ground ammonium sulfate to stabilize the enzyme. Mix the enzyme and ammonium sulfate thoroughly before the addition of water. Pipet 2 mL water and mix into a thick slurry. Pipet 2 more mL of water and mix again. Store at 4° C.

c. Solution C

Weigh exactly 10,000 Units Sigma P-8250 peroxidase into a paper cup or beaker. (Approximately 0.6 grams)

d. Solution D

Add 15 mL water to 0.3 grams of 4-aminophenazone (i.e., 4-aminoantipyrine). This solution must be made fresh just before preparation of the working solution and any extra is discarded after use.

e. Working Solution

To a liter amber volumetric flask, add the following:

1. Solution A, 500 mL
2. Solution B, 1.0 mL—(Glucose oxidase)
3. Solution C, 1.0 mL—(Peroxidase 10,000 units)
4. Solution D, 5.0 mL (4-AAP)
5. Solution A, 500 mL This GOP is stable for three months when stored in the dark at 4° C.

The % of gelatinization in the legumes is tested on the final bean product after retorting in which the vehicle has been added to the legume. Prior to measuring the % gelation, the legume is separated from the sauce by filtering (straining into a strainer) and washing the collected legumes.

If sugars have been added to the legumes during the processing, then the sample is desugared by grinding a weighed sample (if Bean wet, the amount is 1.5 g, if Bean in sauce the amount is 5.0 g), and mixing with boiling water (7 ml if wet Bean, 4 ml if Bean in sauce) , removing precipitate, and extracting the sugars with denaturing ethyl alcohol (35 mL) and centrifuging the samples at ¾ speed in a centrifuge, e.g., IEC, HN SII for 5 min., decanting off and discarding the alcohol.

| PROCEDURE FOR TOTAL AND GELATINIZABLE STARCH Weight Table | |
|---|---|
| Bean, wet (no syrup) | 1.5 g |
| Bean, dry | 1.0 g |
| Flour, wheat | 0.5 g |
| Glucose (standard) | 0, 0.1, 0.2, 0.3, 0.4, 0.5 grams |
| Wheat starch (standard) | 0, 0.1, 0.2, 0.3, 0.4, 0.5 grams |

Procedure

1. The appropriate amount of ground sample is weighed into a flask. 5 standards are used using wheat starch for total starch, and glucose for gelatinizable starch.

2. 50 mL of the appropriate buffer, are added thereto, (pH 4.3 for determining gelatinizable starch and pH 6.0 for total starch.)

3. TOTAL STARCH—AUTOCLAVE (Skip the next step for determining gelatinizable starch)

4. 0.2 mL of heat stable amylase is added to the ground sample and mixed, and autoclaved, for 60 minutes at 121 psi. Cool to touch, add a magnetic stir bar, and adjust pH to 4.5±0.2 with 1N HCl.

5. 0.2 mL amyloglucosidase is added to the flask.

6. The samples are incubated with stirring for 120 minutes. Cool overnight.

7. The contents are transferred to a labeled 500 mL volumetric flask. Dilute to volume and invert 10 times.

8. A portion of the liquid is removed and place in a 1.5 mL labeled mini centrifuge tube. Centrifuge for 5 minutes.

9. A 100 $\mu$L portion is pipeted into each of two 13×100 mm tubes. Add 3.0 mL glucose oxidase/peroxidase reagent to each tube. Incubate for 30 minutes at 50° C. Remove and cool for at least 30 minutes. The absorbance is measured at 510 nm.

Establish a starch curve by plotting the absorbance at 510 nm versus weight of standard.

$$\text{Total starch} = \frac{\text{(Starch from curve)}}{\text{Sample weight}} \times 100$$

$$\text{Gelatinizable starch} = \frac{\text{(Glucose from Curve)}}{\text{Sample weight}} \times .9 \times 100$$

EXAMPLE 1

700 pounds of dry pinto beans were soaked in the apparatus described above. There was no preconditioning step. Beans were soaked at 115° F. for 30 minutes until the observable delta brix was 0.08°. The temperature was then increased from 115° F. to 137° F. over the next 75 minutes. Rapid rehydration occurred from 0 to 55 minutes. The temperature was increased to a second temperature (149° F.) for 30 minutes (from 105 minutes to 135 minutes), then reduced to 145° F. for the rest of the experiment (total elapsed time 362 minutes).

Water was bled in at a constant rate of 1% per minute of the free moisture of the soak apparatus from 45 minutes to 200 minutes. The water was drained and replaced with fresh water at 200 minutes and again at 290 minutes. After the second drain, 0.5% meta phosphate was added. After the phosphate addition, the soak continued for a final 60 minutes. The beans were retorted in brine sauce. The pinto bean was a commercial match, i.e., had the organoleptic properties, relative to traditionally soaked brine bean. The % starch gelation of the pinto bean was 88.4%.

EXAMPLE 2

The procedure of Example 1 was repeated except that the 15 minutes at 149° F. was replaced with 15 minutes at 145° F. Thereafter, the beans were heated at 145° F. for another 225 minutes. The pinto beans were a commercial match i.e., had the organoleptic properties, relative to traditionally soaked brine beans. The % starch gelation in the pinto beans was 85.7%

The above preferred embodiments are given to illustrate the scope and spirit of the present invention. These embodiments will make apparent to those skilled in the art other embodiments and examples. These other embodiments and examples are within the contemplation of the present invention.

Therefore, the present invention should be limited only by the appended claims.

What is claimed is:

1. A process for enhancing the digestion of a legume in a mammal by promoting starch gelation in the legume which comprises:
   (a) soaking a legume in a water bath in stagnant, sprayed or flowing water at a first temperature which is above ambient temperature but less than a first critical rehydration temperature under conditions sufficient to produce a rehydrated legume product having a moisture content which is at least 50% of that of a fully hydrated legume;
   (b) heating the legume product of step (a) at a second temperature under conditions effective to increase the moisture-content to an amount which is greater than that of full hydration, said second temperature being greater than the first critical rehydration temperature, and at or about an endogenous oligosaccharide-reducing enzyme inactivation temperature, but less than a maximum starch gelation temperature; and
   (c) optionally blanching the legume product of step (b).

2. The process according to claim 1 which additionally comprises preserving the legume product of step (c).

3. The process according to claim 1 wherein the legume is a navy bean, pinto bean, kidney bean, great northern bean, white bean, black bean, red bean, lima bean, purple hull bean, garbanzo bean, chick bean or pea, black eye pea, field peas, or combination thereof.

4. The process according to claim 1 wherein the water utilized is tap water, deionized water, distilled water or combination thereof.

5. The process according to claim 4 wherein the water utilized in step (a) has a calcium concentration ranging from 0 to 120 ppm.

6. The process according to claim 1 wherein the enzyme is α-galactosidase.

7. The process according to claim 1 wherein step (a) is conducted at a temperature ranging from about 80° F. to about 130° F.

8. The process according to claim 1 wherein in step (b) the legume product is heated at temperatures ranging from about 145° F. to about 165° F.

9. The process according to claim 1 wherein in step (b) the temperature ranges between about 150° F. and about 160° F.

10. The process according to claim 1 wherein in step (a), the legume produced has a moisture content ranging from about 85% to about 99% of a fully hydrated legume.

11. The process according to claim 1 which additionally comprises:
   (d) adding a food acceptable vehicle to the product of step (c) to form a legume containing mixture comprising from about 5% by weight to about 75% by weight of legume and the remainder being said vehicle; and
   (e) preserving the product of step (d).

12. The process according to claim 1 or 11 wherein at least about 85% of the starch in the legume is gelatinized.

13. The process according to claim 12 wherein at least about 87% of the starch is gelatinized.

14. The process according to claim 1 wherein the legume is subjected to preconditioning prior to step (a).

15. The process according to claim 1 which additionally comprises rinsing the legume of step (a) or step (b) with water containing a metal chelating agent in a concentration ranging from about 0.1% to about 5% by weight.

16. The process according to claim 15 wherein the metal chelating agent is metaphosphate.

17. A process for enhancing the digestion of a legume in a mammal by promoting starch gelation in the legume, which comprises:
   (a) placing said legume in a water bath having stagnant, sprayed or flowing water and monitoring the brix of the water bath;
   (b) soaking the legume of step (a) in said water at a first temperature which is less than a critical rehydration temperature but greater than or equal to ambient temperature under conditions effective to rehydrate the legume to at least about 50% of that of a fully hydrated legume and until there is observed an increase in the brix in the water bath;
   (c) soaking the rehydrated legume of step (b) in a water bath at a transition temperature which is above the first temperature but less than a second temperature for at least until thermal equilibrium is attained;

(d) soaking the legume of step (c) in a water bath at a second temperature which is greater than the temperature in step (c), but less than an inactivation temperature of a naturally occurring oligosaccharide reducing enzyme present in the legume and less than a maximum starch gelation temperature, said soaking at the second temperature being effected until the moisture content of the legume is greater than full hydration; and (e) optionally blanching the legume of step (d).

18. The process according to claim 17 which additionally comprises preserving the legume of step (e).

19. The process according to claim 17 wherein the legume is a navy bean, pinto bean, kidney bean, great northern bean, white bean, black bean, red bean, lima bean, purple hull bean, garbanzo bean, chick bean or pea, black eye pea, field peas, or combination thereof.

20. The process according to claim 17 wherein the water utilized is tap water, deionized water, distilled water or combination thereof.

21. The process according to claim 17 wherein the water utilized in step (a) has a calcium concentration ranging from 0 to 120 ppm.

22. The process according to claim 17 wherein the enzyme is α-galactosidase.

23. The process according to claim 17 wherein step (a) is conducted at a temperature ranging from about 80° F. to about 130° F.

24. The process according to claim 17 wherein in step (d), the legume is soaked at temperatures ranging from about 145° F. to about 165° F.

25. The process according to claim 24 wherein in step (d) the temperature ranges between about 150° F. and about 160° F.

26. The process according to claim 17 wherein in step (b), the legume produced has a moisture content ranging from about 85% to about 99% of a fully hydrated legume.

27. The process according to claim 17 which additionally comprises:

(f) adding a food acceptable vehicle to the legume of step (e) to form a legume containing mixture comprising from about 5% by weight to about 75% by weight of legume and the remainder being said vehicle; and (g) preserving the legume of step (d).

28. The process according to claim 17 wherein at least about 85% of the starch in the legume produced therefrom is gelatinized.

29. The process according to claim 28 wherein at least about 87% of the starch is gelatinized.

30. The process according to claim 17 wherein the legume is subjected to preconditioning prior to step (a).

31. The process according to claim 17 which additionally comprises rinsing the legume produced in step (a) or step (b), or step (c) or step (d) with water containing a metal chelating agent in a concentration ranging from about 0.1% to about 5% by weight.

32. The process according to claim 17 wherein the legume is optionally soaked after step (b) and before step (c) at a third temperature until the desired oligosaccharide concentration is achieved, said third temperature being less than the inactivation temperature of the enzyme but greater than the first temperature and less than the second temperature.

33. The process according to claim 1 wherein in step (b), the legume is heated at a temperature at or above the endogenous oligosaccharide-reducing enzyme inactivation temperature.

34. The process according to claim 1 wherein the legume in step (b) is heated to a temperature ranging from about 5° F. below to about 15° F. above the endogenous oligosaccharide reducing enzyme inactivation temperature.

35. The process according to claim 17 wherein the second temperature is at or above the inactivation temperature of the naturally occurring oligosaccharide reducing enzyme.

36. The process according to claim 17 wherein the second temperature ranges from about 5° F. below to about 15° F. above the inactivation temperature of the endogenous oligosaccharide reducing enzyme.

* * * * *